United States Patent
Morishita et al.

(10) Patent No.: US 7,752,409 B2
(45) Date of Patent: Jul. 6, 2010

(54) STORAGE SYSTEM AND COMPUTER SYSTEM AND PROCESSING METHOD THEREOF

(75) Inventors: Noboru Morishita, Yokohama (JP); Shunji Kawamura, Yokohama (JP); Norio Shimozono, Machida (JP)

(73) Assignee: Hitachi, Ltd., Tokyo (JP)

( * ) Notice: Subject to any disclaimer, the term of this patent is extended or adjusted under 35 U.S.C. 154(b) by 672 days.

(21) Appl. No.: 11/646,821

(22) Filed: Dec. 27, 2006

(65) Prior Publication Data
US 2008/0109615 A1    May 8, 2008

(30) Foreign Application Priority Data
Nov. 7, 2006    (JP)    ............... 2006-301273

(51) Int. Cl.
G06F 12/00    (2006.01)
G06F 13/00    (2006.01)
G06F 13/28    (2006.01)

(52) U.S. Cl. ...................... 711/165; 711/114
(58) Field of Classification Search .................. 711/114
See application file for complete search history.

(56) References Cited

U.S. PATENT DOCUMENTS 6,598,134 B2 *   7/2003   Ofek et al. ................. 711/162
7,114,012 B2     9/2006   Morishita et al.
2005/0005066 A1 * 1/2005  Nakayama et al. .......... 711/117
2005/0193180 A1 * 9/2005  Fujibayashi ................ 711/162
2006/0026345 A1  2/2006   Nishimoto
2006/0080505 A1  4/2006   Arai et al.

FOREIGN PATENT DOCUMENTS

JP    2006-107311 A    4/2006

OTHER PUBLICATIONS

U.S. Appl. No. 11/478,611, filed Jul. 3, 2006, Shunji Kawamura, et al.

* cited by examiner

*Primary Examiner*—Matt Kim
*Assistant Examiner*—Ralph A Verderamo, III
(74) *Attorney, Agent, or Firm*—Sughrue Mion, PLLC

(57) ABSTRACT

This invention aims to improve the data guarantee performance of an external storage apparatus. Upon managing a storage extent of the external storage apparatus as a volume, a guarantee code corresponding to read or write access-target data is created with a guarantee code creation/confirmation unit, the created guarantee code is stored in the external storage apparatus, and, upon executing the read or write access to the storage extent of the external storage apparatus, the concordance of the guarantee code stored in correspondence with the access-target data and the guarantee code created from the access-target data is confirmed with the guarantee code creation/confirmation unit 206, whereby the access-target data can be guaranteed.

6 Claims, 26 Drawing Sheets

FIG.3A

| VOLUME MANAGEMENT INFORMATION ~60 |
|---|
| VOLUME NUMBER |
| STORAGE POSITION: INTERNAL/EXTERNAL |
| DRIVE PATH NUMBER |
| RAID GROUP NUMBER |
| TOP ADDRESS |
| END ADDRESS |
| HOST PATH DEFINITION INFORMATION |
| CAPACITY |
| CACHING EXECUTION STATUS: IN-EXECUTION/NON-EXECUTION |
| EXTERNAL VOLUME ATTRIBUTE: DATA/GUARANTEE CODE |
| EXTERNAL VOLUME ADDITIONAL INFORMATION ~601<br>(DATA VOLUME ADDITIONAL INFORMATION/<br>GUARANTEE CODE VOLUME ADDITIONAL INFORMATION) |

FIG.3B

DATA VOLUME ADDITIONAL INFORMATION ~601a

| |
|---|
| DATA VOLUME STATUS: STATIONARY/IN-MIGRATION |
| VALID INFORMATION FLAG: 1/2 |
| DATA VOLUME INFORMATION 1 ~602 |
| DATA VOLUME INFORMATION 2 ~602 |
| PROGRESS MANAGEMENT ADDRESS |
| GUARANTEE CODE VOLUME STATUS: YES/NO |
| VOLUME NUMBER (GUARANTEE CODE) |

FIG.3C

DATA VOLUME INFORMATION ~602

| |
|---|
| VALID FLAG |
| EXTERNAL VOLUME NUMBER |
| DATA ADJACENT GUARANTEE CODE STATUS: YES/NO |
| GUARANTEE CODE ATTRIBUTE: LA, LRC FORMAT |

FIG.3D

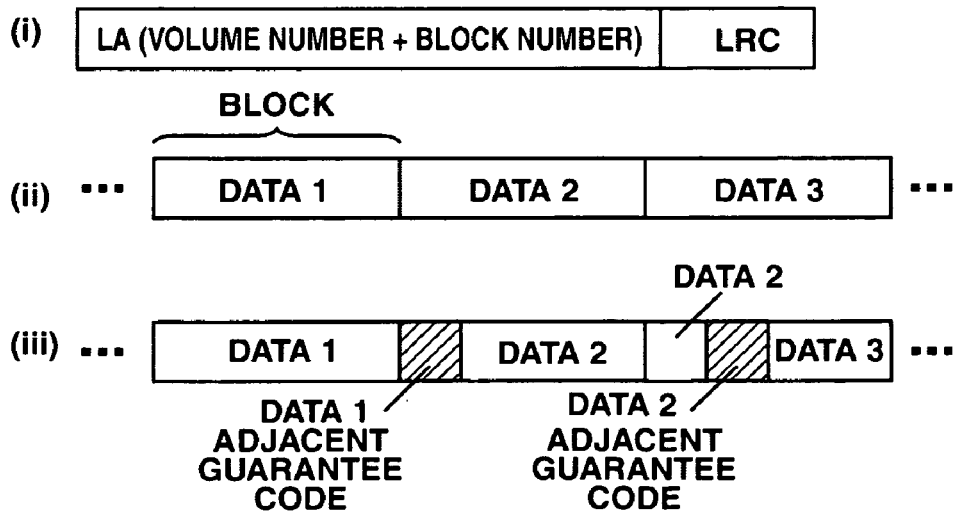

FIG.3E

GUARANTEE CODE VOLUME ADDITIONAL INFORMATION ~601b

| |
|---|
| GUARANTEE CODE VOLUME STATUS: STATIONARY/IN-MIGRATION |
| VALID INFORMATION FLAG: 1/2 |
| GUARANTEE CODE VOLUME INFORMATION 1 ~603 |
| GUARANTEE CODE VOLUME INFORMATION 2 ~603 |
| PROGRESS MANAGEMENT ADDRESS |
| VOLUME NUMBER (COMPATIBLE DATA 1 |

FIG.3F

GUARANTEE CODE VOLUME INFORMATION ~603

| |
|---|
| VALID FLAG |
| EXTERNAL VOLUME NUMBER |
| HASH FORMAT INFORMATION |
| KEY STORAGE DESTINATION INFORMATION |
| GUARANTEE CODE ATTRIBUTE: LA, LRC FORMAT |

FIG.3G

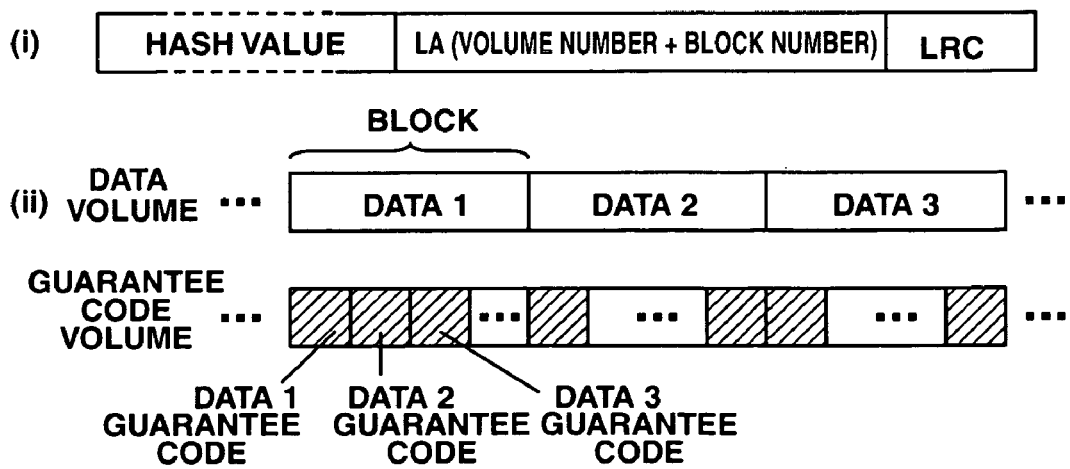

FIG.6A

KEY STORAGE UNIT ~2072

| KEY ENCRYPTION KEY (COMMON KEY) |
| COMMUNICATION KEY (PRIVATE KEY) |

FIG.6B

KEY INFORMATION ~62

| VOLUME KEY |
| INTER SYSTEM COMMUNICATION KEY (COMMON KEY/PUBLIC KEY) |

FIG.7

AUTHENTICATION CODE INFORMATION ~63

| SUPPORT ALGORITHM INFORMATION |

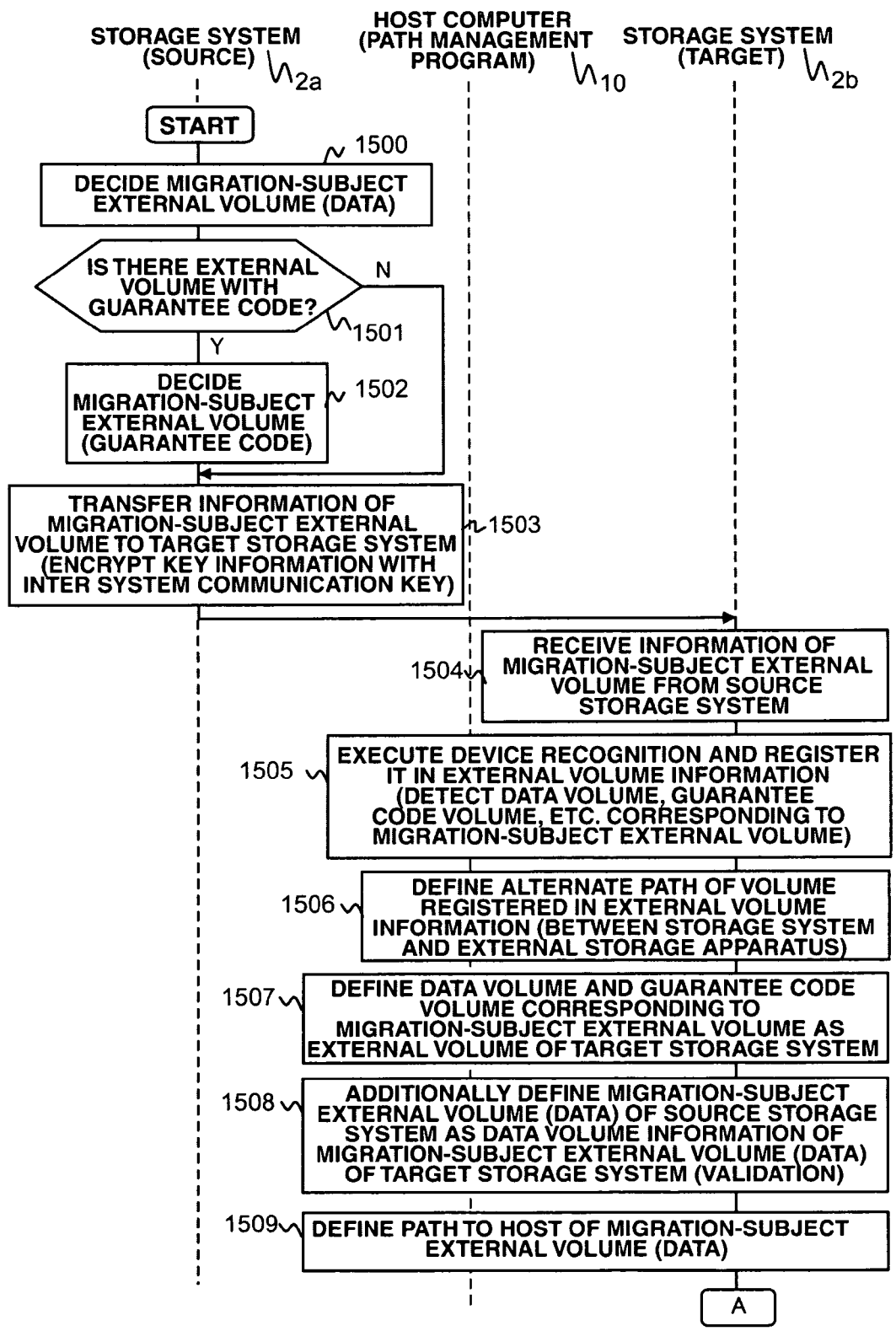

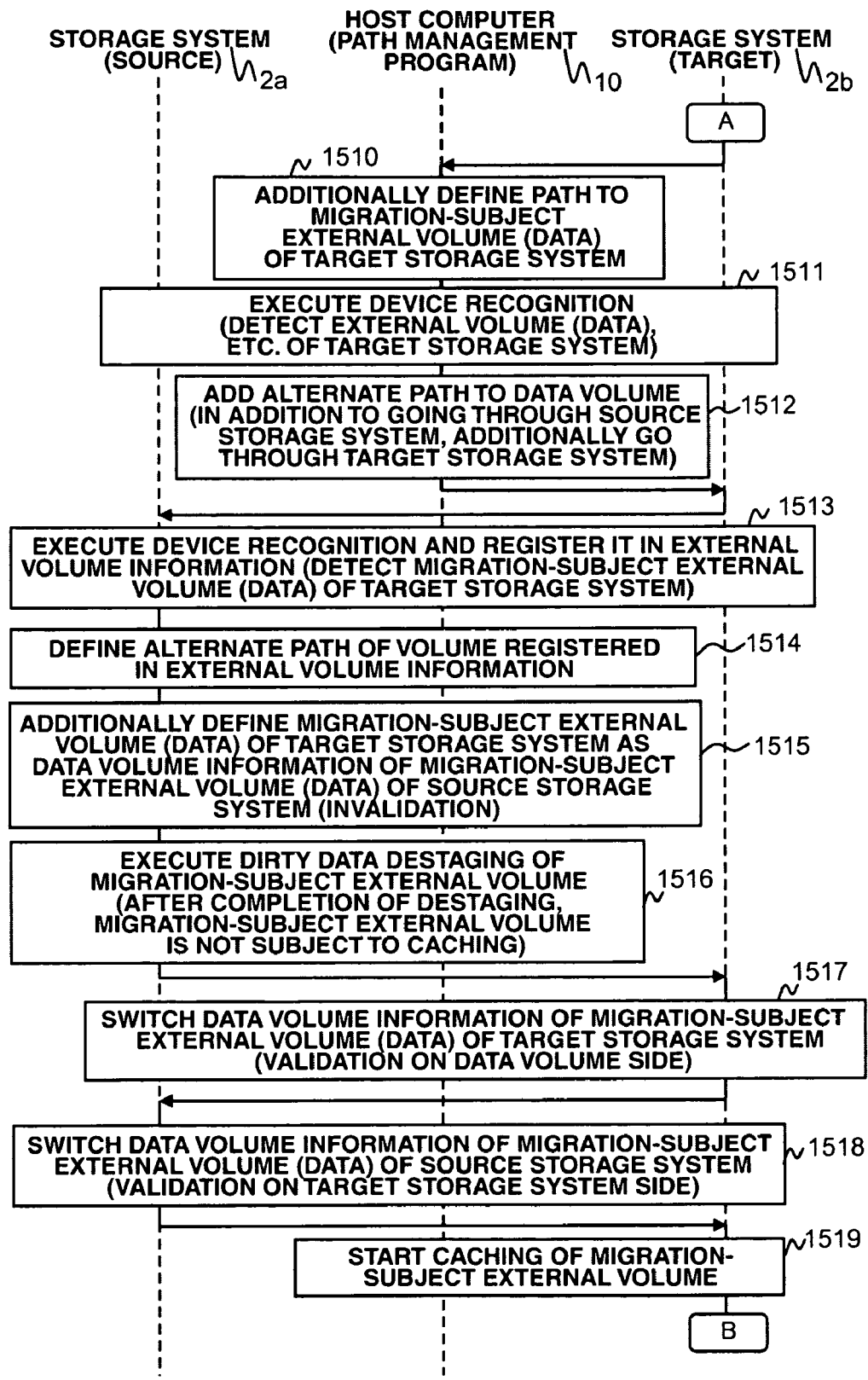

(STATUS: 1500)

(STATUS: 1504)

(STATUS: 1519)

(STATUS: 1521)

STORAGE SYSTEM AND COMPUTER SYSTEM AND PROCESSING METHOD THEREOF

CROSS REFERENCES

This application relates to and claims priority from Japanese Patent Application No. 2006-301273, filed on Nov. 7, 2006, the entire disclosure of which is incorporated herein by reference.

BACKGROUND

The present invention relates to data guarantee technology in a storage system configuring a computer system.

As one method of managing a large-capacity storage extent at low cost, there is storage virtualization technology. With the storage virtualization technology, a second storage apparatus (system) is connected to a first storage system, and a storage extent of the second storage apparatus (system) is provided to a host as a storage extent of the first storage system. In response to an access request from the host to the first storage system, it is determined whether the access destination is the storage extent of the first storage system or the storage extent of the second storage apparatus (system), and the access request is transferred to the appropriate access destination.

Japanese Patent Laid-Open Publication No. 2006-107311 discloses technology guaranteeing the accurateness of write/read data in a disk device with a fixed sector length. In this document, since data, error detection/correction information, and guarantee information are stored in different disk devices, respectively, it is possible to guarantee the accurateness of write data and read data even in a disk array device configured from a plurality of disk devices with a fixed sector length.

SUMMARY

By using the storage virtualization technology, it is possible to configure a large-capacity storage system by integrating storage systems having different performance, reliability, function, cost and other factors. For example, a high-performance, high-reliability, high-function management source storage system is prepared and a low-function, low-cost external storage apparatus is connected to such management source storage system. Further, by changing the storage destination storage apparatus according to the characteristics of the data to be stored, data management matching the data value will be enabled. For instance, business information that is accessed frequently is stored in a storage extent of the management source storage system, and archive data that is not accessed as often is stored in an external storage apparatus.

Nevertheless, with the conventional storage virtualization technology, no consideration is given to the data guarantee of the storage extent of the external storage apparatus to be provided as the storage extent of the management source storage system. When adopting the configuring of connecting a plurality of low-cost external storage apparatuses to a high-function management source storage system, in comparison to the management source storage system, there are cases where the external storage apparatus does not have a sufficient data guarantee function for guaranteeing the accurateness of the read/write data. Here, with the management source storage system, the storage extent of the external storage apparatus needs to be managed separately as a storage extent with low data guarantee performance.

Further, with the conventional storage virtualization technology, no consideration is given to the switching of the management source storage system of the external storage apparatus applying the data guarantee function. For the purpose of realizing load balancing and high availability of the system, the management source storage system of a certain external storage apparatus needs to be switched while maintaining the data guarantee performance. Nevertheless, when migrating the management source of the external storage apparatus to another storage system without giving any consideration to the data guarantee performance, if the target storage system does not have the same data guarantee function, the data guarantee performance will deteriorate. Further, even when the target storage system has the same data guarantee function, regeneration of the guarantee code or the like for realizing the data guarantee is required, and processing costs will increase.

Thus, an object of the present invention is to improve the data guarantee performance of the external storage apparatus connected with the storage virtualization technology. Another object of the present invention is to switch the management source to manage the external storage apparatus while maintaining the data guarantee performance of the external storage apparatus.

In order to achieve the foregoing objects, the present invention guarantees the access-target data by creating, upon managing a storage extent of the external storage apparatus as a volume, a guarantee code corresponding to read or write access-target data, storing the created guarantee code in the external storage apparatus, and, upon executing the read or write access to the storage extent of the external storage apparatus, confirming the concordance of the guarantee code stored in correspondence with the access-target data and the guarantee code created from the access-target data.

Upon migrating data stored in the external storage apparatus and management information containing a guarantee code stored in the external storage apparatus in correspondence with the data from the source storage system to the target storage system, data of the external storage apparatus can be migrated while maintaining the data guarantee performance of the external storage apparatus by switching the management source of management information from a source storage system to a target storage system.

According to the present invention, it is possible to improve the data guarantee performance of the external storage apparatus. Further, it is possible to switch the management source of the external storage apparatus while maintaining the data guarantee performance of the external storage apparatus.

DESCRIPTION OF DRAWINGS

FIG. 3A is a diagram showing an example of volume management information according to an embodiment of the present invention;

FIG. 3B is a diagram showing an example of data volume additional information according to an embodiment of the present invention;

FIG. 3C is a diagram showing an example of data volume information according to an embodiment of the present invention;

FIG. 3D is a diagram showing an example of a data volume adjacent guarantee code according to an embodiment of the present invention;

FIG. 3E is a diagram showing an example of guarantee code volume additional information according to an embodiment of the present invention;

FIG. 3F is a diagram showing an example of guarantee code volume information according to an embodiment of the present invention;

FIG. 3G is a diagram showing an example of a guarantee code according to an embodiment of the present invention;

FIG. 6A is a diagram showing an example of a key to be stored in a key storage unit according to an embodiment of the present invention;

FIG. 6B is a diagram showing an example of key information according to an embodiment of the present invention;

FIG. 7 is a diagram showing an example of authentication code information according to an embodiment of the present invention;

FIG. 15A is a flowchart showing an example of a routine of migrating external volume management from a source storage system to a target storage system according to an embodiment of the present invention;

FIG. 15B is a flowchart subsequent to FIG. 15A;

DETAILED DESCRIPTION

Figure 1:
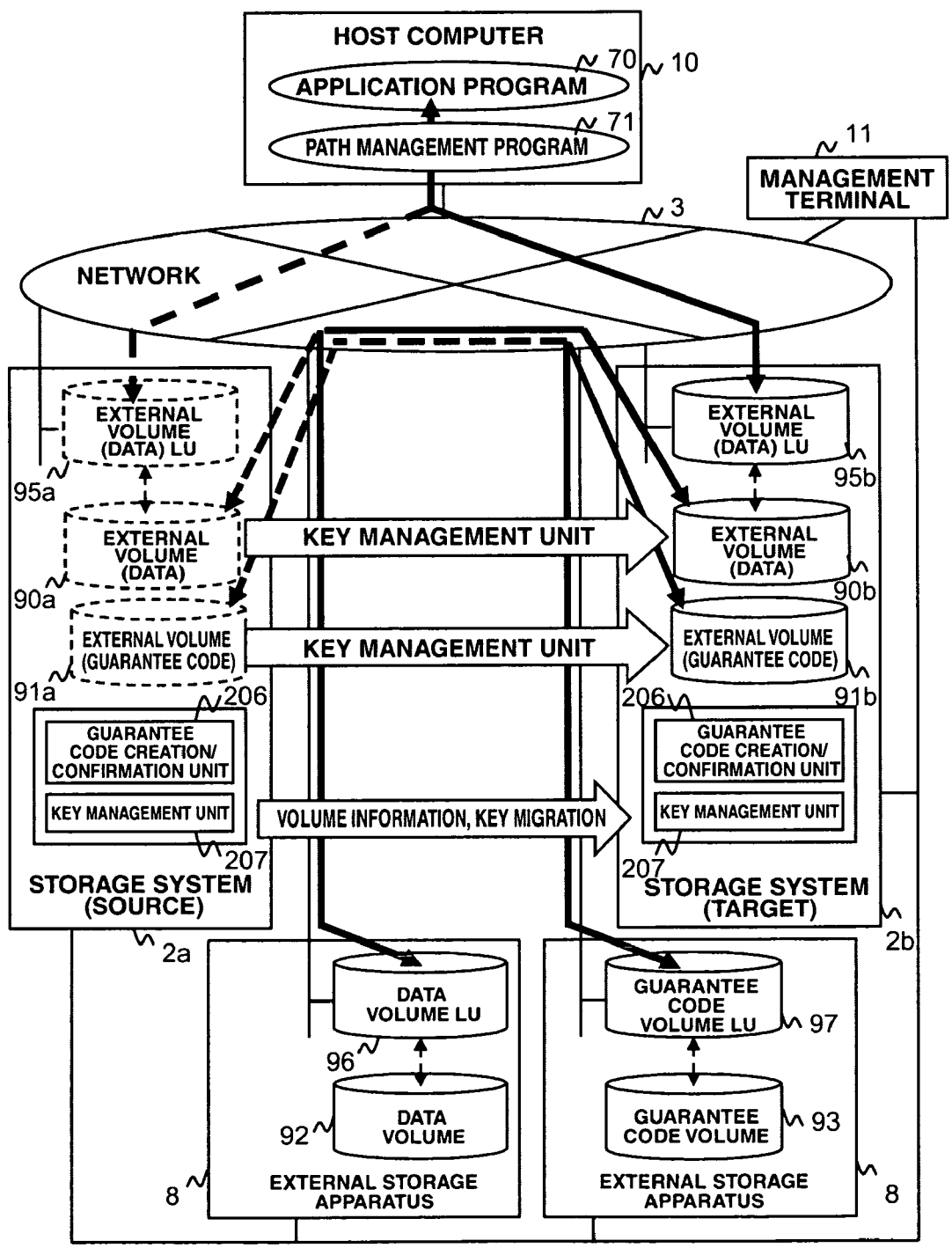
FIG. 1 is a configuration diagram showing an embodiment according to the present invention.

FIG. 1 shows a configuration diagram according to a first embodiment of the present invention. A storage system 2 and an external storage apparatus 8 are connected to a host computer 10 via a network 3. Further, a management terminal 11 used for changing the configuration status or referring to the internal status of the storage system 2 and the external storage apparatus 8 is connected to the storage system 2 and the external storage apparatus 8 via the network 3.

The storage system 2 (2a, 2b) is associated with a volume of the external storage apparatus 8, and has an external volume in which an actual storage extent exists in the external storage apparatus 8. When the volume existing in the external storage apparatus 8 is a data volume 92 storing data, an external volume (data) 90 is in correspondence, and when it is a guarantee code volume 93 storing a guarantee code of data, an external volume (guarantee code) 91 is in correspondence. As path information for accepting access from the host computer 10 or another storage system 2, the external volume (data) 90 has an external volume (data) LU (Logical Unit) 95, the data volume 92 has a data volume LU 96, and the guarantee code volume 93 has a guarantee code volume LU 97, respectively. The data external storage apparatus 8 storing the volume 92 and the guarantee code volume 93 may be separate or the same. Further, the storage system 2 has a CPU (processor) 200a for controlling the writing of a guarantee code in the external storage apparatus 8 or the reading of a guarantee code stored in the external storage apparatus 8, a guarantee code creation/confirmation unit 206 having a creation/confirmation function and an encryption/decryption function of the guarantee code, and a key management unit 207 for managing a key for a hash or a code. In other words, the guarantee code creation/confirmation unit 206 functions as a guarantee code creation unit for creating a guarantee code corresponding to read or write access-target data, and functions as a confirmation unit for confirming the concordance of a guarantee code created from access-target data and a guarantee code read from the external storage apparatus 8 as a guarantee code corresponding to access-target data.

The application program 70 and the path management program 71 are operating in the host computer 10. The path management program 71 manages a plurality of access pathways to data, and the access request from the application program 70 to the storage system 2 is controlled so that it is issued to a volume of an appropriate storage system selected from a plurality of access pathways by the path management program 71. When migrating the management of the data volume 92 and the guarantee code volume 93 of the external storage apparatus 8 between the storage system 2a and the storage system 2b, volume information and key information are migrated.

Figure 2:
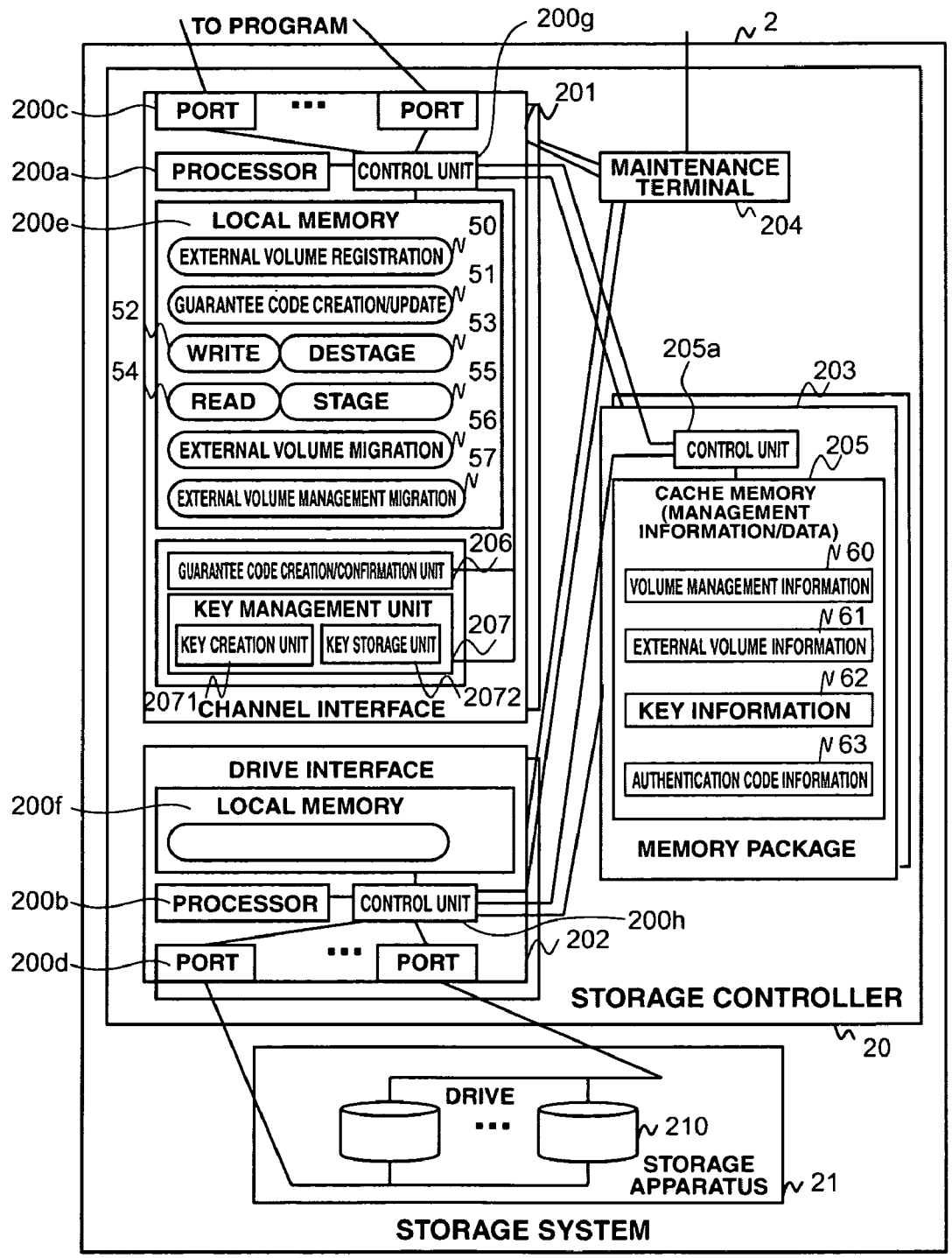
FIG. 2 is a configuration diagram of a storage system according to an embodiment of the present invention.

FIG. 2 shows the outline of the inside of the storage system 2. The storage system 2 is configured from the following elements. A storage apparatus 21 storing a disk drive 210, a channel interface 201 for connecting the host computer 10, another storage system 2 and external storage apparatus 8 with the storage controller 20 via the network 3, a drive interface 202 for connecting the storage apparatus 21 and a storage controller 20, and a storage controller 20 connecting the memory package 203 and the maintenance terminal 204 via a path.

The storage apparatus 21 stores one or more disk drives (hard disk drives) 210. Each drive 210 has a plurality of I/O ports. A plurality of storage apparatuses 21 may exist in the storage apparatus 21. Incidentally, in substitute for the disk drive (hard disk drive), the storage device may be configured from a semiconductor memory device such as a flash memory.

The storage controller 20 stores a channel interface 201 for controlling the data transfer among the host computer 10, another storage system 2, the external storage apparatus 8 and the cache memory 205, and a drive interface 202 for controlling the data transfer between the cache memory 205 and the drive 210. The channel interface 201 receives read/write requests from the host computer 10 and other storage systems 2, and also issues read/write requests to other storage systems 8 and the external storage apparatus 8. Two drive interfaces 202 form a pair, and are connected to the drive 210 of the storage apparatus 21. The inside of the channel interface 201 and the drive interface 202 is configured from I/O ports 200c, 200d, local memories 200e, 200f, CPUs (processors) 200a, 200b, and control units 200g, 200h of data transfer.

The guarantee code creation/confirmation unit 206 has an encryption/decryption function and a creation/confirmation function of a hash value of a guarantee code and a LRC (Longitudinal Redundancy Check) code. A hash value is a value obtained by calculating a hash function such as SHA-1 (Secure Hash Algorithm 1) based on the input data and key (initial value) information. Further, LRC is calculated as parity in the horizontal direction of the input data. The encryption/decryption function supports the common key block code such as AES (Advanced Encryption Standard) for encrypting and storing a hash key to the cache memory 205 and a communication key between the storage systems 2. Further, when wishing to conduct the communication between the storage systems 2 with higher security, the encryption/decryption function public key code of an encryption/decryption function may also be provided.

The key management unit 207 is configured from a key creation unit 2071 for creating a volume key as a hash key of each volume, and a communication key between systems for communicating with other storage systems 2, and a key storage unit 2072 storing a key encryption key (common key) for encrypting/decrypting key information 62 stored in the cache memory 205. Further, wishing to conduct communication between the storage systems 2 with higher security, a communication key (private key) of a public key code of the own storage system 2 can also be stored.

The guarantee code creation/confirmation unit 206 and the key management unit 207 are mounted as function blocks having tamper-resistance. Tamper-resistance refers to quality of making unauthorized referral and falsification of information inside the function from the outside more difficult, and is normally used by combining a plurality of technologies concerning hardware and software. In FIG. 2, although the function blocks of the guarantee code creation/confirmation unit 206 and the key management unit 207 are mounted on the channel interface 201 in order to lay importance on the guarantee code creation/confirmation performance, as another configuration, for instance, the guarantee code creation/confirmation unit 206 and the key management unit 207 may be mounted as independent packages.

The CPU (processor) 200a executes various control programs such as an external volume registration program 50, a guarantee code creation/update program 51, a write program 52, a destaging program 53, a read program 54, a staging program 55, an external volume migration program 56, and an external volume management migration program 57. Various control programs are executed by the CPU 200a of the channel interface 201, and the CPU (processor) 200b of the drive interface 201. A plurality of channel interfaces 201 and drive interfaces 202 may exist in the storage system 2.

Further, the memory package 203 is configured from a cache memory 205 that stores management information of the storage system 2 such as volume management information 60, external volume information 61, key information 62, and authentication code information 63 and relays the data transfer between the host computer 10 and the drive 210, and a control unit 205a for controlling the data transfer.

The maintenance terminal 204 is used for changing the configuration or referring to the internal status of the storage system 2. The maintenance terminal 204 also relays the command from the management terminal 11 to the storage system 2. The maintenance terminal 204 may also be connected to the channel interface 201 and the drive interface 202.

FIG. 3A shows the volume management information 60. The volume management information 60 exists for each volume of the storage system 2, and stores information of each volume. The volume management information 60 is configured from a volume number that is uniquely decided in the storage system 2, a storage position showing whether the storage extent exists inside the storage system 2 ("internal") or exists in another external storage apparatus 8 ("external"), a drive path number that specifies a pair of paths in the paths connected from the drive interface 202 pair to the drive 210, a RAID group number for specifying the drive 210 group in the range of distributing and storing the data group to be provided with a redundant code upon storing data with a redundant code in the drive 210 in the form of RAID (Redundant Array of Independent Disks) 1, RAID 5 or the like, a top address number and a termination address number in the RAID group, host path definition information for specifying the port and LUN (Logical Unit Number) of the channel interface 201 enabling access from the host computer 10 or another storage system 2, a volume capacity, a caching execution status showing whether to leave the clean/dirty data upon using the cache memory 205, an external volume attribute representing the stored data type (data/guarantee code) when the volume is an external volume, and external volume additional information 601 storing detailed information of the external volume.

With respect to items in which the storage position is "internal", the external volume attribute and the external volume additional information may be invalidated. With respect to items in which the storage position is "external", the items of drive path number, RAID group number, top address number, and termination address number may be invalidated.

FIG. 3B shows data volume additional information 601a in the external volume additional information 601. The data volume additional information 601a is stored in the external volume additional information 601 of the volume management information 60 when the volume is an external volume, and the external volume attribute is data. The data volume additional information 601a includes a data volume status showing whether the data volume 92 is being migrated pursuant to the change in the storage position of the data volume 92 or the creation of the data adjacent guarantee code, a valid information flag showing which of the two pieces of data volume information 602 is valid, data volume information 602 storing detailed information of the data volume 92, progress management address for managing the progress of the migration of the data volume 92, a guarantee code volume status showing whether the data volume 92 has a guarantee code volume 93, and a volume number of a guarantee code when possessing such guarantee code.

FIG. 3C shows the data volume information 602. The data volume information 602 includes a valid flag showing whether the data volume information 602 is valid, an external volume number for specifying the external volume information 61 managing the data volume 92, a data adjacent guarantee code status to the data volume 92, and a guarantee code attribute as the code type (LA (Logical Address), LRC), code size, internal code format and so on of the data adjacent guarantee code. Incidentally, upon migrating the management of the data volume 92 between the storage systems 2, if the volume number of the source storage system 2a and the target storage system 2b will change, the internal LA volume number offset information is stored in the guarantee code attribute, and the volume number is corrected during the data adjacent guarantee code creation/confirmation.

FIG. 3D shows the data adjacent guarantee code. The data adjacent guarantee code, for instance, as shown in (i), may be configured from LA formed from a volume number and a block number of the external volume (data) 90, and LRC as the horizontal parity of data. When using data pre-stored in the external storage apparatus 8 as the data of the data volume, normally, as shown in (ii), the data, for instance, is stored by being divided into blocks of 512B units. Thus, in order to add a data adjacent guarantee code, the external volume migration program 57 will rearrange the data adjacent guarantee code in the same/different volumes of the same/different external storage apparatus 8 as shown in (iii). Incidentally, the data referral of the rearranged volume is conducted by referring to the guarantee code attribute and correcting the access top and access size based on the size of the data adjacent guarantee code.

FIG. 3E shows the guarantee code volume additional information 601b in the external volume additional information 601. The guarantee code volume additional information 601b is stored in the external volume additional information 601 of the volume management information 60 when the volume is an external volume, and the external volume attribute is a guarantee code. The guarantee code volume additional information 601b has a guarantee code volume status showing whether the guarantee code volume 93 is being migrated pursuant to the change in the storage position of the guarantee code volume 93 or the change in the contents of the guarantee code, a valid information flag shown which of the two pieces of guarantee code volume information 603 is valid, guarantee code volume information 603 for storing detailed information of the guarantee code volume 93, a progress management address for managing the progress of migration of the guarantee code volume 93, and a volume number of the corresponding data volume 92.

FIG. 3F shows the guarantee code volume information 603. The guarantee code volume information 603 includes a valid flag showing whether the guarantee code volume information 603 is valid, an external volume number managing the guarantee code volume 93, a hash format information showing the hash type, hash size and so on stored in the guarantee code volume 93, key storage destination information showing the key storage position of a volume key in the key information 62, and a guarantee code attribute such as the code type (LA, LRC), code size, and internal code format of the guarantee code other than hash.

FIG. 3G shows the guarantee code. The guarantee code, for instance, as shown in (i), may be configured from a hash value calculated based on the data and key, LA formed from a volume number and a block number of the external volume (data/guarantee code), and LRC as the horizontal parity of the data/guarantee code. Normally, since the guarantee code is smaller in comparison to the corresponding data, the guarantee code volume stores, as shown in (ii), a guarantee code corresponding to a plurality of data blocks in a single block. The position of the guarantee code corresponding to the data block is calculated by specifying the guarantee code volume 93 corresponding to the data volume 92, and seeking the guarantee code size from the hash format information and the guarantee code attribute. Incidentally, upon migrating the management of the guarantee code volume 93 between the storage systems 2, if the volume number of the source storage system 2a and the target storage system 2b will change, the internal LA volume number offset information is stored in the guarantee code attribute, and the volume number is corrected during the guarantee code creation/confirmation.

Figure 4A:
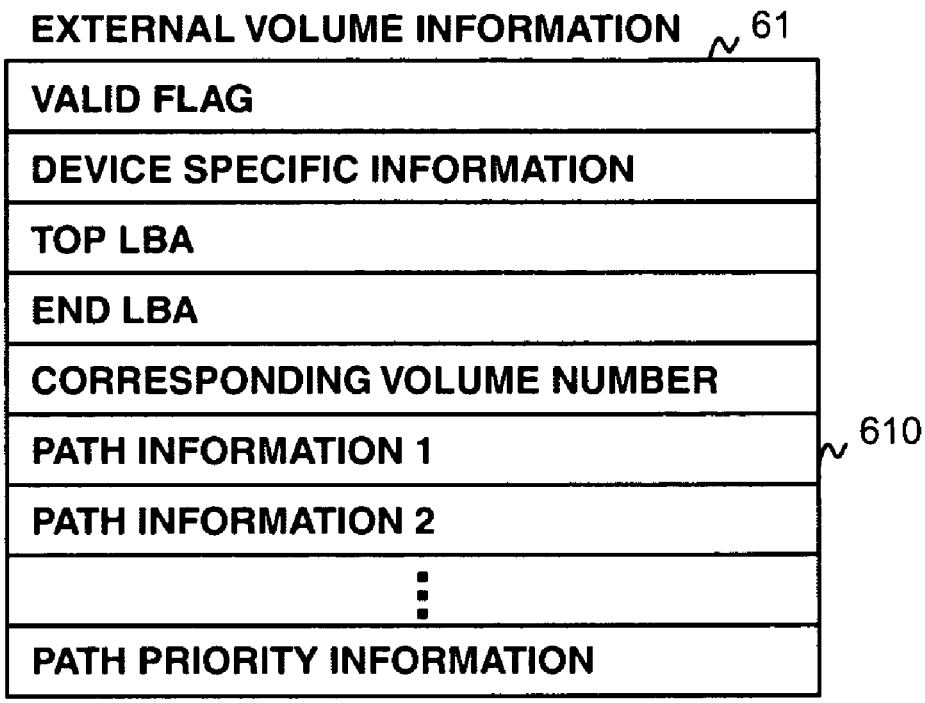
FIG. 4A is a diagram showing an example of external volume information according to an embodiment of the present invention.

FIG. 4A shows the external volume information 61. The external volume information 61 is information for uniquely specifying other storage systems 2 or the volume of the external storage apparatus 8, and includes a valid flag showing whether the information stored in such extent is valid, device specifying information storing information obtained in the INQUIRY command or the like of SCSI (Small Computer System Interface) for uniquely specifying other storage systems 2 or the volume of the external storage apparatus 8, a top LBA (Logical Block Address) and a termination LBA, a corresponding volume number for specifying the volume of the corresponding storage system 2, a list of path information 610 as the access pathway to other storage systems 2 or the volume of the external storage apparatus 8, and path priority information showing the usage priority of a plurality of paths.

Figure 4B:
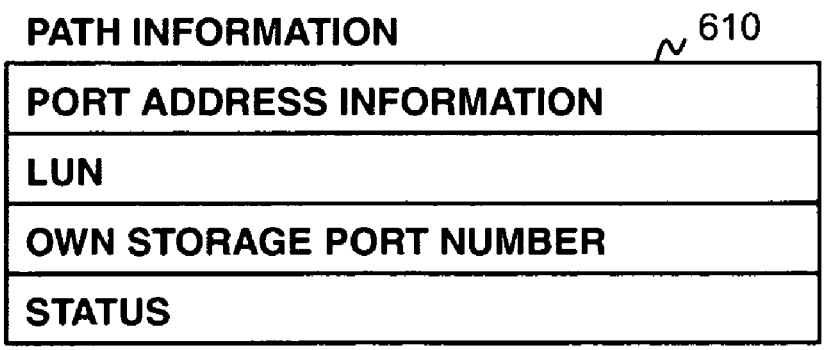
FIG. 4B is a diagram showing an example of path information according to an embodiment of the present invention.

FIG. 4B shows the path information 610 configuring the path information list of the external volume information 610. The path information 610 is information for specifying the path to access other storage systems 2 or the target volume of the external storage apparatus 8, and includes port address information for specifying the port of other storage systems 2 or the external storage apparatus 8, a LUN number of a corresponding target volume in the port, an own storage port number of the storage apparatus 2 for accessing the target volume, and a status of the pathway to be accessed.

Figure 5:
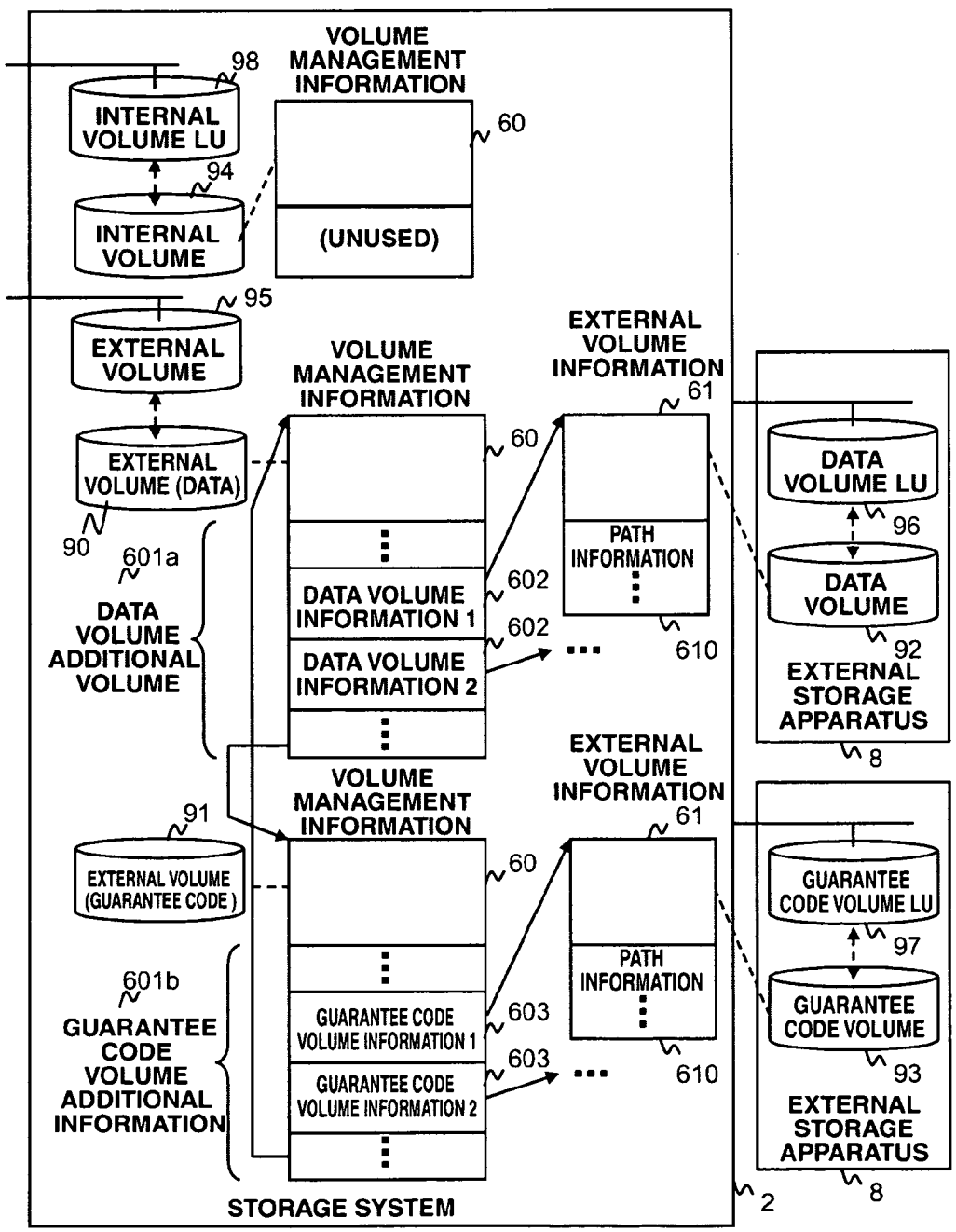
FIG. 5 is a diagram showing an example of the relationship of a volume, volume management information, and external volume information according to an embodiment of the present invention.

FIG. 5 summarizes the relationship of the volume and management information. The volume managed by the storage system 2 includes an internal volume 94 having a storage extent in the storage apparatus 21, an external volume (data) 90 having a storage extent in another storage system 2 or the external storage apparatus 8 and which stores data, and an external volume (guarantee code) 91 having a storage extent in another storage system 2 or the external storage apparatus 8 and which stores a guarantee code. As the path information for receiving access from the host computer 10 or other storage systems 2, the internal volume 94 has an internal volume LU 98 and the external volume (data) 90 has an external volume (data) LU 95 in the host path definition information, respectively. The volume management information 60 corresponds to each volume, and data volume additional information 601a having the data volume information 602 is added to the external volume (data) 90, and guarantee code volume additional information 601b having the guarantee code volume information 603 is added to the external volume (guarantee code) 91. The external volume information 61, which corresponds to the data volume 92 and the guarantee code volume 93, corresponds to the data volume information 602 and the guarantee code volume information 603. As the access path information to the external storage apparatus, the data volume 92 as a data volume LU 96 and the guarantee code volume 93 has a guarantee code volume LU 97 in the path information 610, respectively. Incidentally, when there are a plurality of pieces of access path information, a plurality of pieces of path information 610 are registered.

FIG. 6A shows the keys to be stored in the key management (storage) unit. The key storage unit has a key encryption key (common key) for encrypting/decrypting the key information 62 stored in the cache memory 205. Further, when wishing to conduct communication between the storage systems 2 with higher security, a communication key (private key) of the public key code of the own storage system 2 may also be stored.

FIG. 6B shows the key information 62. The key information 62 is configured from a volume key as a hash key of each volume, and an inter-system communication key for communicating with other storage systems 2. The volume key is encrypted with the key encryption key and stored in the cache memory 205. The volume key storage extent may also store a plurality of volume keys for each volume in consideration of the migration of the guarantee code volume 93. Further, the inter-system communication key is encrypted with the key encryption key and stored in the cache memory 205 when communication with other storage systems 2 with a common key code. Moreover, when wishing to conduct communication between the storage systems 2 with higher security, an inter-system communication key may also be stored in the cache memory 205 as a public key.

FIG. 7 shows the authentication code information 63. The authentication code information 63 stores information of the guarantee code format (hash, LA, LRC, etc.) supported by the storage system 2, and is referred to upon selecting the target storage system 2b of the external volume.

Figure 8:
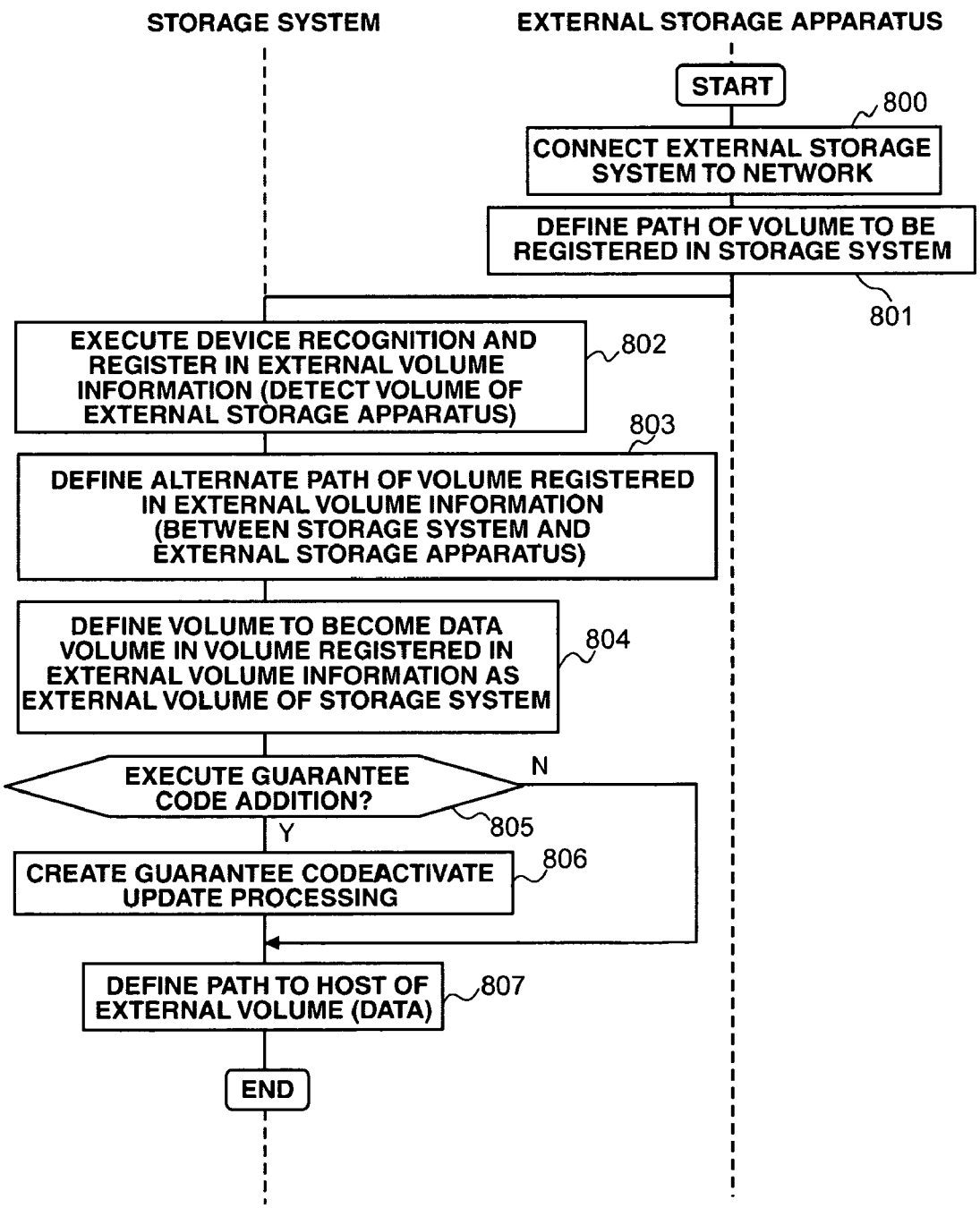
FIG. 8 is a flowchart showing an example of an external volume registration routine according to an embodiment of the present invention.

FIG. 8 shows the external volume registration routine. Foremost, the external storage apparatus 8 having a volume to be subject to external volume registration is connected to the network 3 (step 800). The external storage apparatus 8 thereafter defines a path to the volume to be subject to external volume registration (step 801).

Subsequently, when the external volume registration program 50 is executed as a result of the host computer 10/management terminal 11 being booted, the storage system 2 executes the following processing. Foremost, the storage system 2 executes device recognition to detect the volume of other storage systems 2 or the external storage apparatus 8 and register it in the external volume information 61 (step 802), and thereafter defines the alternate path of the volume registered in the external volume information 61 (step 803). When the same volume is visible from a plurality of ports of other storage systems 2 or the external storage apparatus 8, such volume is registered in the path information 610, and the priority of the access path is decided. Then, a volume to become the data volume 92 is defined as an external volume among the volumes of other storage systems 2 or the external storage apparatus 8 registered in the external volume information 61. Here, the storage system 2 sets the volume management information 60 and the data volume additional information 601a, and registers the external volume information 61 corresponding to the data volume 92 in the data volume information 602. Next, whether to add a guarantee code is decided (step 805).

When a guarantee code is not to be added (step 805: N), the routine proceeds to step 807, and, when a guarantee code is to be added (step 805: Y), the storage system 2 activates the guarantee code creation/update program 51 as guarantee code creation/update processing (step 806). Finally, the storage system 2 defines a path to the host computer 10 of the external volume (data) 90 associated with the data volume (step 807).

Figure 9:
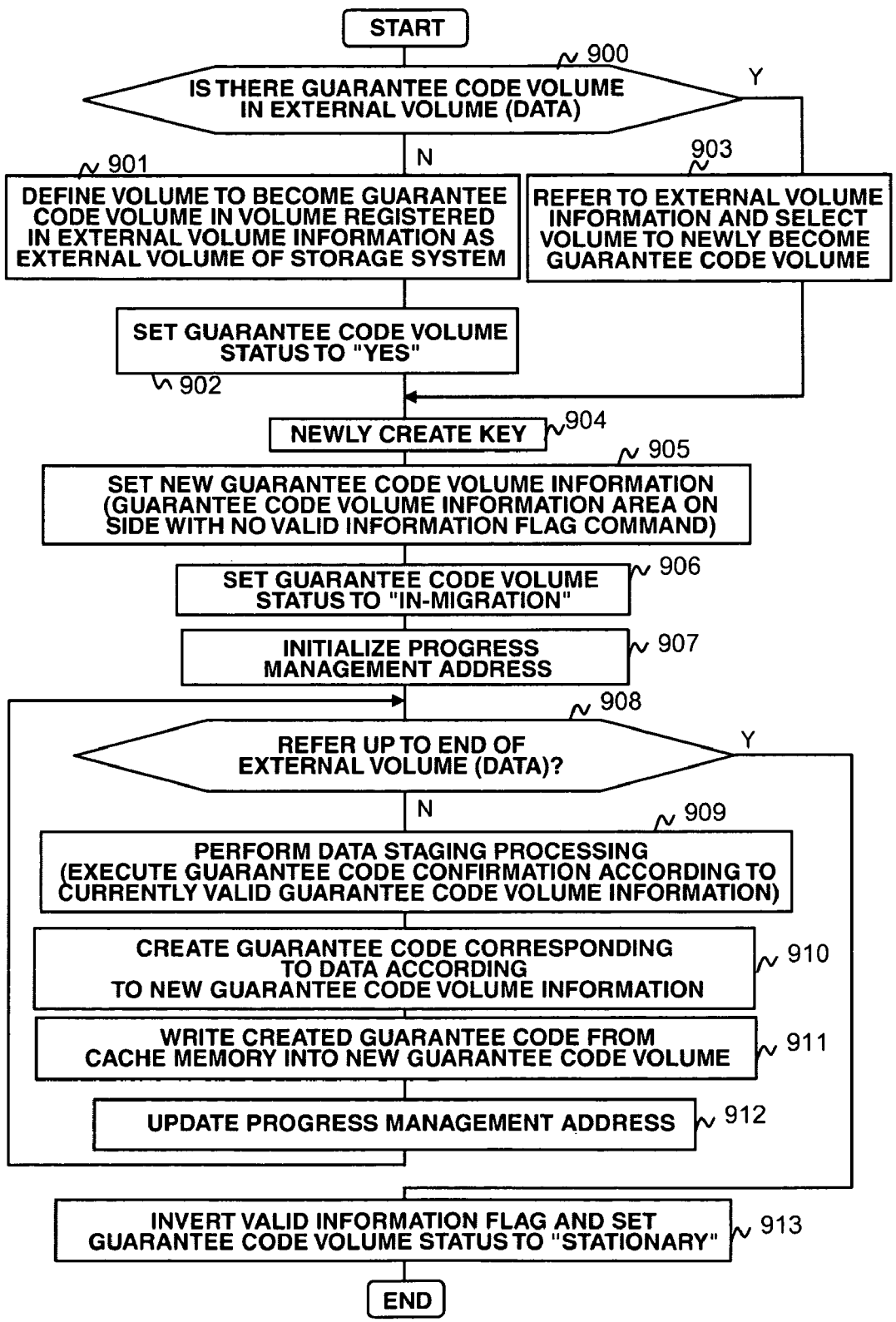
FIG. 9 is a diagram showing an example of a guarantee code creation/update program according to an embodiment of the present invention.

FIG. 9 shows the guarantee code creation/update program 51. Upon starting the processing of the guarantee code creation/update program 51, foremost, the external volume registration program 50 is activated at the time of the external volume registration. Further, the processing of the guarantee code creation/update program 51 is executed upon receiving a guarantee code creation/update request from the host computer 10/management terminal 11. Although the following explanation describes each step being executed by the processor 200a, when using the processor 200b or another processor to execute such steps, the processing may be migrated between the processors for execution via the cache memory 205.

Foremost, the processor 200a determines where the external volume (data) 90 has a guarantee code volume 93 (step 900). When the external volume (data) 90 does not have a guarantee code volume 93 (step 900: N), a guarantee code needs to be created, and a volume to become the guarantee code volume 93 is selected among the volumes registered in the external volume information 61 and defined as an external volume (step 901). Here, the processor 200a sets the volume management information 60 and the guarantee code volume additional information 601b, and registers the external volume information 61 corresponding to the guarantee code volume 93 in the guarantee code volume information 603. Incidentally, since the guarantee code is written in the guarantee code volume 93, data that was originally stored in the guarantee code volume 93 will become invalid. Subsequently, the processor 200a updates the guarantee code volume status of the data volume additional information 601a of the external volume (data) 90 to "YES" (step 902).

Meanwhile, when the external volume (data) has a guarantee code volume (step 900: Y), the guarantee code needs to be updated, the processor 200a refers to the external volume information 61 and selects a volume to newly become the guarantee code volume 93 (step 903). Incidentally, since the guarantee code is written in the guarantee code volume 93, data that was originally stored in the guarantee code volume 93 will become invalid.

Subsequently, the processor 200a lets the key management unit 207 newly create a key required to calculate a hash value to be stored in the guarantee code volume 93 (step 904), encrypt the generated key with a key encryption key, and store it in the key information 62. The processor 200a thereafter sets new guarantee code volume information 603 (step 905). The set area is a guarantee code volume information 603 area on the side that is not commanded by the valid information flag. The processor 200a sets the external volume number, hash format information, key storage destination information, and guarantee code attribute for specifying the external volume information 61 of the guarantee code volume, and then sets the guarantee code volume status of the guarantee code volume additional information 601b during migration (step 906). The processor 200a thereafter initializes the progress management address of the guarantee code volume additional information 601b to the top of the external volume (data) 90 (step 907).

Subsequently, the processor 200a determines whether reference has been made up to the termination of the external volume (data) 90 (step 908). When reference has been made up to the termination of the external volume (data) 90 (step 908:Y), the routine proceeds to step 913, and, when reference has not been made up to the termination of the external volume (data) 90 (step 908: N), staging of data from the data volume 92 is executed (step 909). With respect to staging, this will be described later as a staging program 55. Incidentally, when updating the guarantee code, the guarantee code confirmation during data staging is executed according to currently valid guarantee code volume information 603.

Subsequently, the processor 200a lets the guarantee code creation/confirmation unit 206 create a guarantee code according to new guarantee code volume information 603 (step 910). This may also be configured from a hash value calculated from the data and key, LA formed from a volume number and a block number of the external volume (data), and LRC as the horizontal parity of data. The processor 200a thereafter writes the created guarantee code from the cache memory into the new guarantee code volume 93 (step 911), and updates the progress management address for the amount that the guarantee code has been created/updated (step 912). Then, the routine proceeds to step 908, and, finally, the processor 200a inverts the valid information flag (1↔2), and sets the guarantee code volume status of the guarantee code volume additional information 601b to stationary (step 913).

Figure 10:
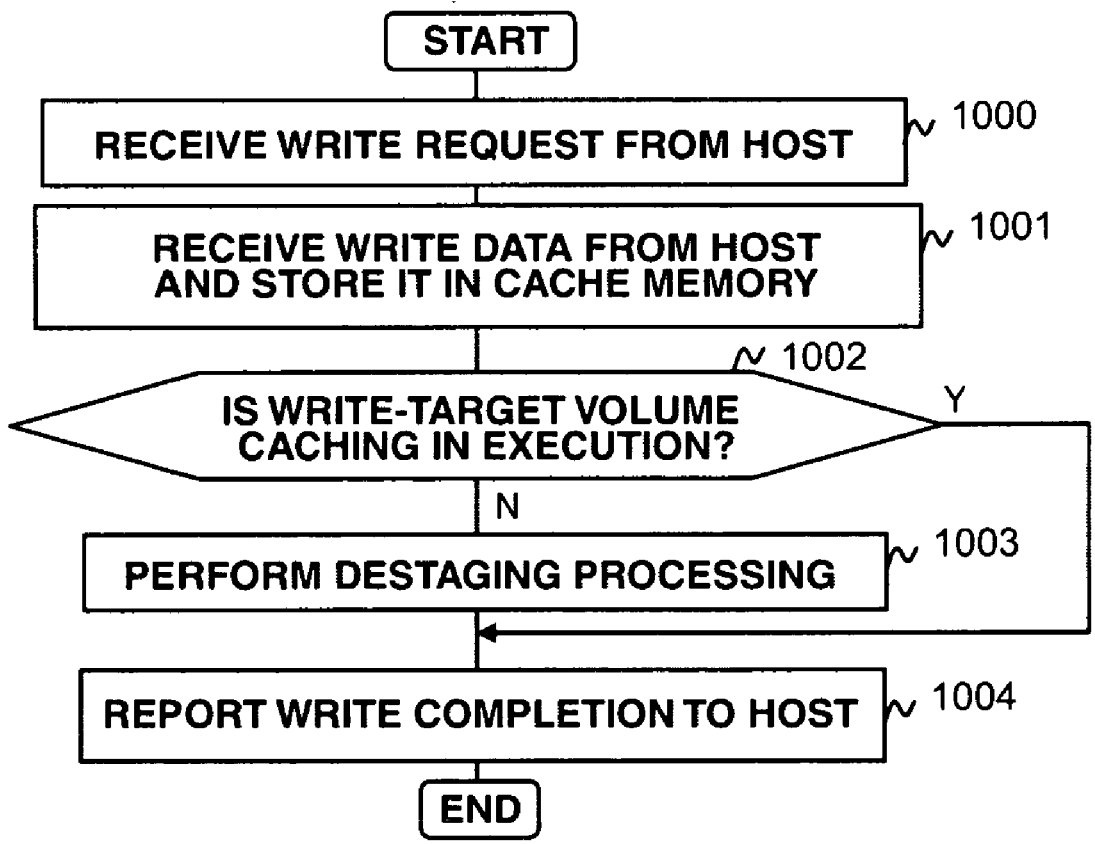
FIG. 10 is a diagram showing an example of a write program according to an embodiment of the present invention.

FIG. 10 shows the write program 52. The write program 52 is activated upon receiving a write request from the host computer 10.

Foremost, the processor 200a receives a write request from the host computer 10 (step 1000), and thereafter receives write data from the host computer 10 and stores it in the cache memory 205 (step 1001). Subsequently, the processor 200a determines the caching execution status of the write target volume from the volume management information 60 (step 1002). When caching is being executed (step 1002: Y), the routine proceeds to step 1004, and when caching is not being executed (step 1002: N), destaging of the write-target data is executed (step 1003). With respect to destaging, this will be described later as a destaging program 53. Finally, the processor 200a reports the write completion to the host computer 10 (step 1004).

Figure 11:
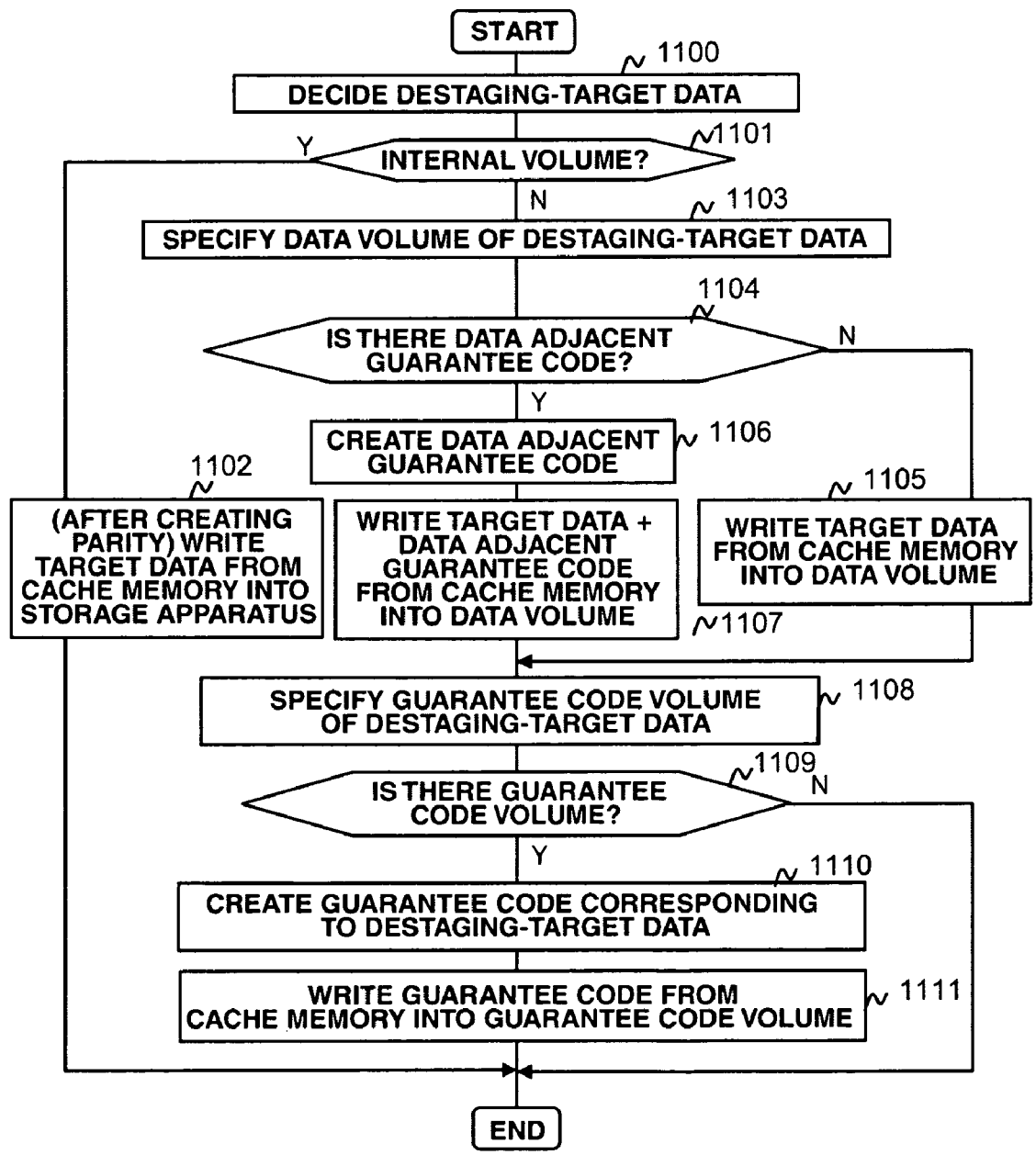
FIG. 11 is a diagram showing an example of a destaging program according to an embodiment of the present invention.

FIG. 11 shows the destaging program 53. The destaging program 53 is executed during the write program 52 when a write request is received from the host computer 10. Further, asynchronous to the write request from the host computer 10, the storage system 2 executes the processing of the destaging program 53.

Foremost, the processor 200a decides destaging-target data (step 1100). When executing the destaging program 53 during the execution of the write program 52 upon receiving the write request, the processor 200a makes the write data the destaging-target data. When executing the destaging program 53 asynchronous to the write request, for instance, the processor 200a makes the oldest data among the dirty data stored in the cache memory 205 the destaging-target data. Subsequently, the processor 200a determines whether the destaging-target data is data of the internal volume 94 (step 1101), and, when i is data of the internal volume 94 (step 1101: Y), the processor 200a writes the destaging-target data from the cache memory 205 into the storage apparatus 21 (1102). In the case of a RAID configuration internal volume 94, the processor 200a executes parity creation if required, and writes the data and parity in the storage apparatus 21. This processing is thereby ended.

Meanwhile, when the destaging-target data is not data of the internal volume 94 (step 1101: N); in other words, when the destaging-target data is data of the external volume (data) 90, the processor 200a specifies the destaging-target data volume 92 (step 1103). For example, the processor 200a refers to the data volume additional information 601a from the volume management information 60 corresponding to the external volume (data) 90, and specifies the data volume 92 by following the external volume information 61 from the currently valid data volume information 602. Thereupon, the processor 200a refers to the progress management address when the data volume status is currently in migration, and specifies the data volume 92 according to the data volume information 602 corresponding to the destaging destination address.

Subsequently, the processor 200a determines the data adjacent guarantee code status from the data volume information 602 (step 1104). When the data adjacent guarantee code status is "NO" (step 1104: N), the destaging-target data is written from the cache memory 205 into the data volume 92 (step 1105). Thereafter, the routine proceeds to step 1108. Meanwhile, when the data adjacent guarantee code status is "YES" (step 1104: Y), the processor 200a lets the guarantee code creation/confirmation unit 206 create a data adjacent guarantee code according to the data volume information 602 (step 1106), and writes the destaging-target data and the data adjacent guarantee code from the cache memory 205 into the data volume 92 (step 1107).

Subsequently, the processor 200a specifies the guarantee code volume 93 to be destaged (step 1108). For example, the processor 200a refers to the volume number (guarantee code) from the volume management information 60 corresponding to the external volume (data) 90 to specify the external volume (guarantee code) 91, refers to the guarantee code volume additional information 601b from the volume management information 60 corresponding to the external volume (guarantee code) 91, and specifies the guarantee code volume 93 by following the external volume information 61 from a currently valid guarantee code volume information 603. Thereupon, the processor 200a refers to the progress management address when the guarantee code volume status is in migration, and specifies the guarantee code volume 93 according to the guarantee code volume information 603 corresponding to the destaging destination address.

Subsequently, the processor 200a determines the guarantee code volume status (step 1109). As cases where it is determined that there is no guarantee code volume, in addition to the guarantee code volume status of the data volume additional information 601a being "NO", there are cases when the guarantee code volume status of the data volume additional information 601a is "YES", and the guarantee code volume information 603 corresponding to the destaging destination address of the guarantee code volume additional information 601b of the corresponding guarantee code volume is invalid (when the data guarantee volume is being created).

The processor 200a ends the processing when there is no guarantee code volume (step 1109: N) and, when there is a guarantee code volume (step 1109: Y), lets the guarantee code creation/confirmation unit 206 create a guarantee code according to the guarantee code volume information 603 (step 1110), and writes the created guarantee code from the cache memory 205 into the guarantee code volume 93 (step 1111).

Figure 12:
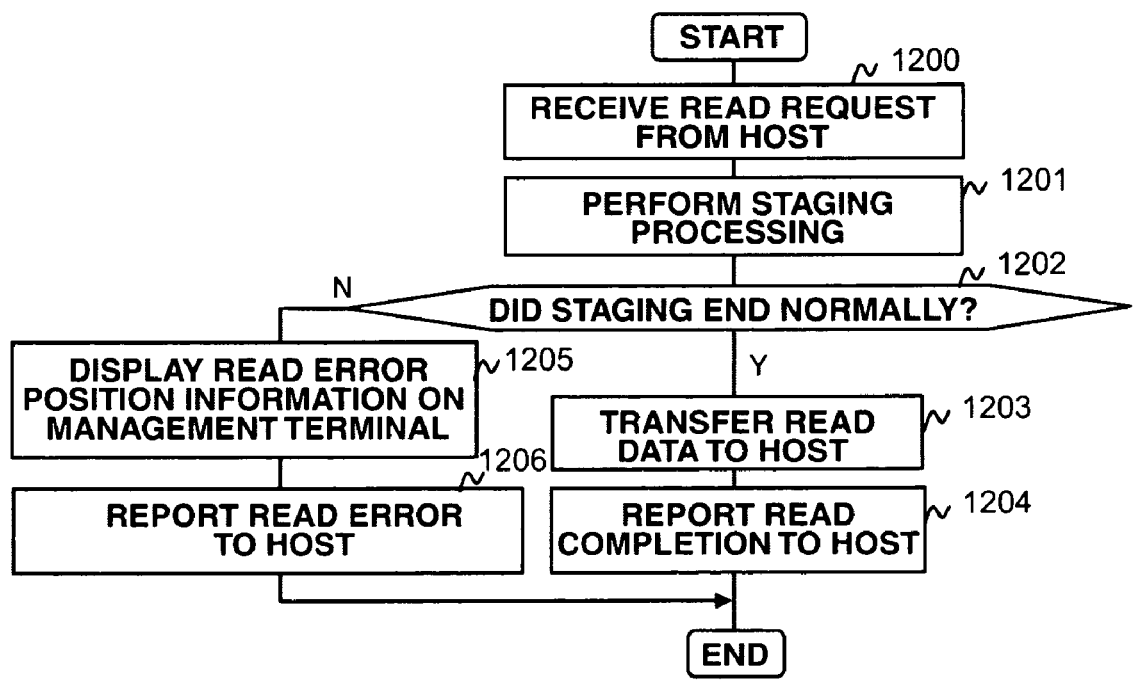
FIG. 12 is a diagram showing an example of a read program according to an embodiment of the present invention.

FIG. 12 shows the read program 54. The read program 54 is activated upon receiving a read request from the host computer 10.

Foremost, when the processor 200a receives a read request from the host computer 10 (step 1200), the processor 200a executes staging of the read-target data (step 1201). With respect to staging, this will be described later as a staging program 55.

Subsequently, the processor 200a determines whether the staging ended normally (step 1202). When the staging ended normally (step 1202: Y), the processor 200a transfers the read-target data to the host computer 10 (step 1203), and reports the read completion to the host computer 10 (step 1204).

Meanwhile, when the staging did not end normally (step 1202: N), the processor 200a displays a read failure together with the position information of read-target data on the management terminal 11 (step 1205), and reports the read failure to the host computer 10 (step 1206). As the method of recovering the location subject to a read failure, for instance, there is a method of rewriting data from the host computer 10 to the read failure position.

Figure 13:
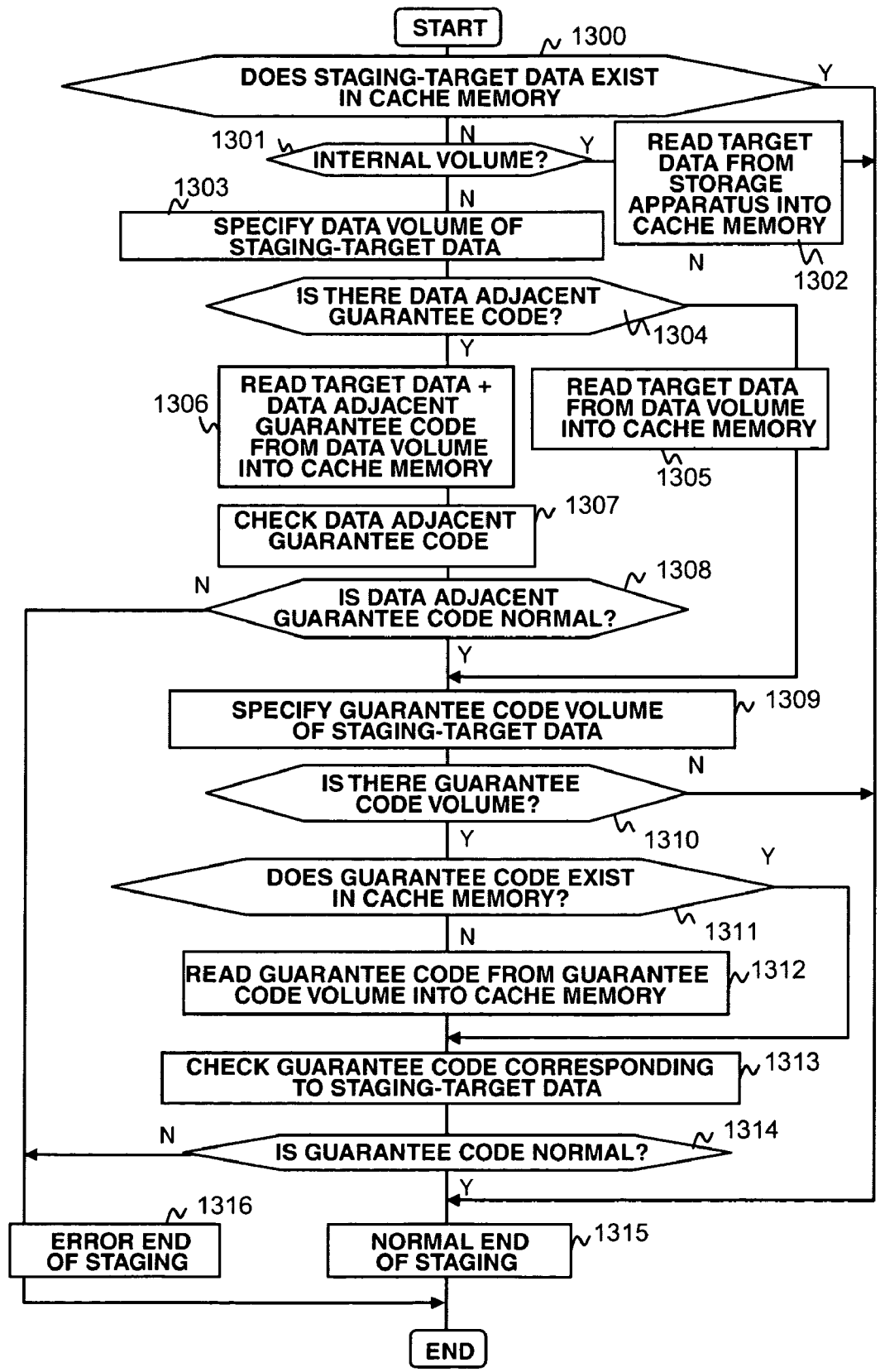
FIG. 13 is a diagram showing an example of a staging program according to an embodiment of the present invention.

FIG. 13 shows the staging program 55. The staging program 55 is executed during the read program 54 upon receiving a read request from the host computer 10. Further, this is also executed in the guarantee code creation/update program 51 and the external volume migration program 56.

Foremost, the processor 200a determines whether staging-target data exists in the cache memory 205 (step 1300). When staging-target data exists in the cache memory 205 (step 1300: Y), the processor 200a determines that the staging ended normally (step 1315) and ends this processing. When staging-target data does not exist in the cache memory 205 (step 1300: N), the processor 200a determines whether the staging-target data is data of the internal volume 94 (step 1301).

When the staging-target data is data of the internal volume 94 (step 1301: Y), the processor 200a reads the staging-target data from the storage apparatus 21 into the cache memory 205 (step 1302), determines that the staging ended normally (step 1315), and ends this processing. Meanwhile, when the staging-target data is not data of the internal volume 94 (step 1301: N); in other words, when the staging-target data is data of the external volume (data) 90, the processor 200a specifies the data volume of the staging-target data (step 1303). Refer to step 1103 for details.

Subsequently, the processor 200a determines the data adjacent guarantee code status from the data volume information 602 (step 1304). When data adjacent guarantee code status is "NO" (step 1304: N), staging-target data is read from the data volume 92 into the cache memory 205 (step 1305). Thereafter, the routine proceeds to step 1309. When the data adjacent guarantee code status is "YES" (step 1304: Y), the processor 200a reads the staging-target data and the data adjacent guarantee code from the data volume 92 into the cache memory 205 (step 1306).

The processor 200a thereafter lets the guarantee code creation/confirmation unit 206 create the data adjacent guarantee code according to the data volume information 602, compare the read data adjacent guarantee code (step 1307), and determines whether the data adjacent guarantee code is normal (step 1308). When the created data adjacent guarantee code and the read data adjacent guarantee code coincide, the processor 200a determines that the data adjacent guarantee code is normal. Meanwhile, when the data adjacent guarantee code is not normal (step 1308: N), the processor 200a determines that the staging ended in an error (step 1316), and ends this processing. When the data adjacent guarantee code is normal (step 1308: Y), the processor 200a specifies the guarantee code volume 93 to be staged (step 1309). Refer to step 1108 for details.

Subsequently, the processor 200a determines the guarantee code volume status (step 1310). Refer to step 1109 for details. When there is no guarantee code volume (step 1310: N), the processor 200a determines that the staging ended normally (step 1315), and ends this processing. When there is a guarantee code volume (step 1310: Y), the processor 200a determines that a guarantee code exists in the cache memory 205 (step 1311), and, when a guarantee code exists in the cache memory (step 1311: Y), the routine proceeds to step 1313.

When a guarantee code does not exist in the cache memory (step 1311: N), the processor 200a reads a guarantee code from the guarantee code volume 93 into the cache memory 205 (step 1312), lets the guarantee code creation/confirmation unit 206 create a guarantee code according to the guarantee code volume information 603, compare it with the read guarantee code (step 1313), and determines whether the guarantee code is normal (step 1314). Subsequently, when the created guarantee code and the read guarantee code coincide, the processor 200a determines that the guarantee code is normal. When the guarantee code is normal (step 1314: Y), the processor 200a determines that the staging ended normally (step 1315), and ends this processing. Meanwhile, when the guarantee code is not normal (step 1314: N), the processor 200a determines that the staging ended in an error (step 1316), and ends this processing.

Figure 14:
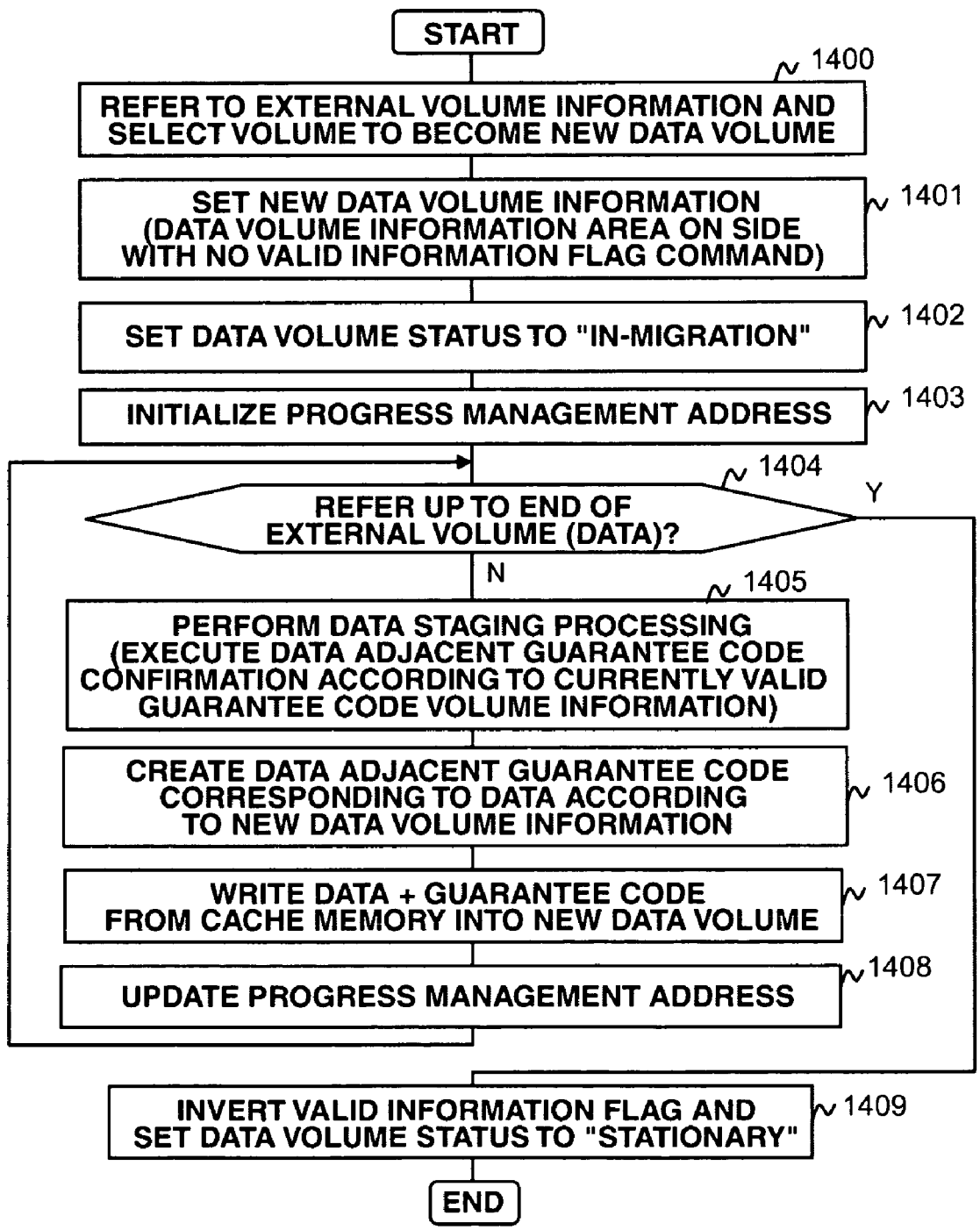
FIG. 14 is a diagram showing an example of an external volume migration program according to an embodiment of the present invention.

FIG. 14 shows the external volume migration program 56. The external volume migration program 56 is directed to the migration of the external volume (data), and is executed upon receiving a data adjacent guarantee code addition request or a data storage destination data volume 92 change request from the host computer 10/management terminal 11.

Foremost, the processor 200a refers to the external volume information 61 to newly select a volume to become the data volume 92 (step 1400), and sets new data volume information 602 (step 1401). The set area is a data volume information 602 area on the side that is not commanded by the valid information flag. The processor 200a sets the external volume number, data adjacent guarantee code status, and guarantee code attribute for specifying the external volume information 61 of the data volume. Subsequently, the processor 200a sets the data volume status of the data volume additional information 601a during migration (step 1402), and initializes the progress management address of the data volume additional information 601a to the top of the external volume (data) 90 (step 1403).

Subsequently, the processor 200a determines whether reference has been made up to the termination of the external volume (data) 90 (step 1404). When reference has been made up to the termination of the external volume (data) 90 (step 1404: Y), the routine proceeds to step 1409, and, when reference has not been made up to the termination of the external volume (data) 90 (step 1404: N), staging of data from the data volume 92 is executed (step 1405). With respect to staging, the staging program 55 is executed. Incidentally, the data adjacent guarantee code confirmation during data staging is executed according to currently valid data volume information 602.

Subsequently, the processor 200a lets the guarantee code creation/confirmation unit 206 create a data adjacent guarantee code according to new data volume information 602 (step 1406). Here, this may also be configured from LA formed from a volume number and a block number of the external volume (data), and LRC as the horizontal parity of data. The processor 200a thereafter writes the created data adjacent guarantee code from the cache memory into the new data volume (step 1407), and updates the progress management address for the amount that the data adjacent guarantee code has been created (step 1408). Then, the routine proceeds to step 1404, and, finally, the processor 200a inverts the valid information flag (1↔2), and sets the data volume status of the data volume additional information 601a to stationary (step 1409).

Figure 15C:
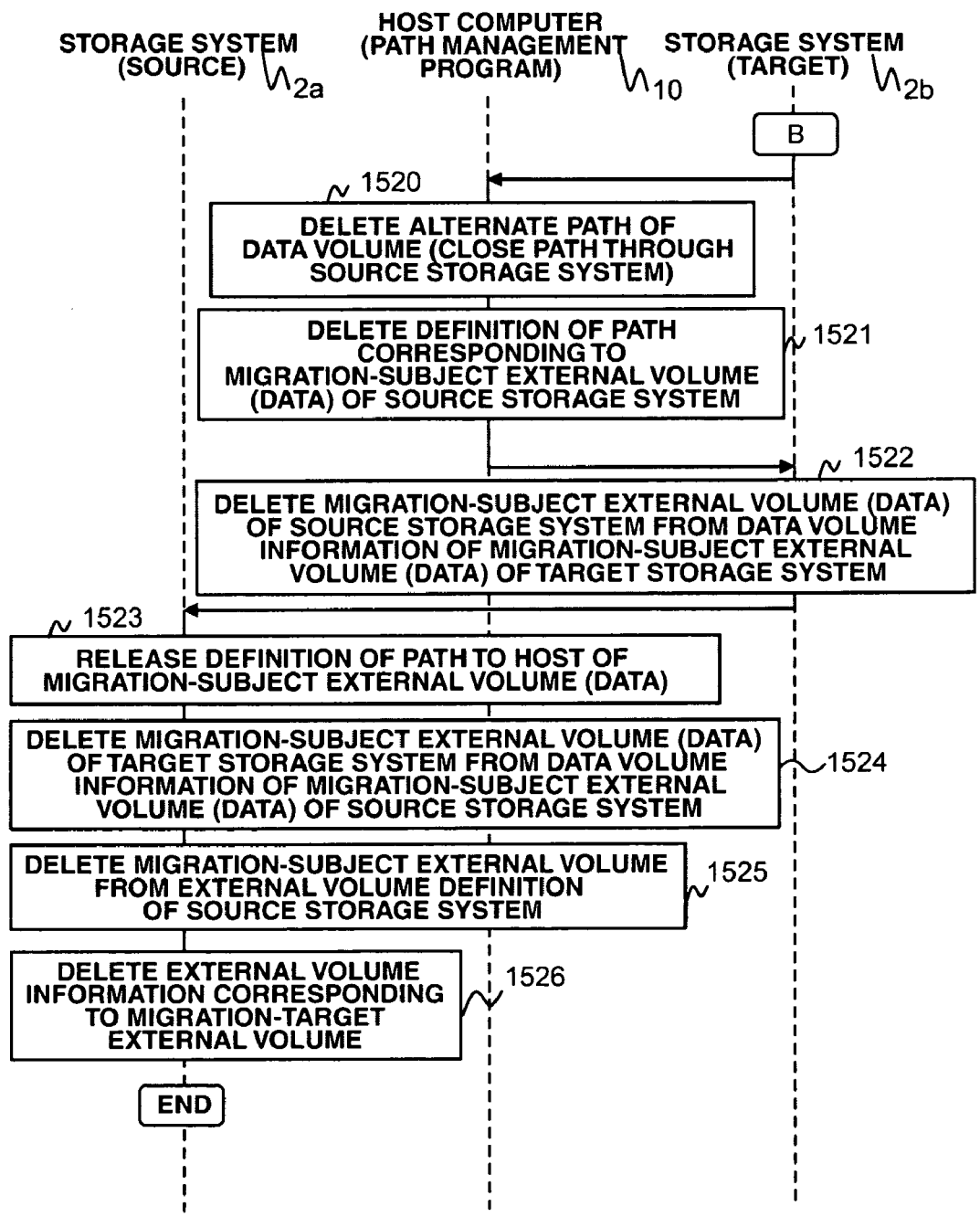
FIG. 15C is a flowchart subsequent to FIG. 15B.

FIG. 15 shows the routine for migrating the management of the data volume 92 and the guarantee code volume 93 between the source storage system 2a and the target storage system 2b. Commands in the respective routines of migration are issued from the host computer 10/management terminal 11. In the storage system 2, the external volume management migration program 57 executes the processing. Incidentally, FIG. 16A to 16L show the migration status during the processing routine illustrated in FIG. 15. In the explanation of FIG. 15, the numbers of corresponding FIG. 16A to 16L are included. In order to simplify the representation, the indication of LU is omitted in FIG. 16.

Foremost, the source storage system 2a decides a migration-target external volume (data) 90a (step 1500) (FIG. 16A), determines whether the migration-target external volume (data) 90a has a guarantee code volume (step 1501). When the guarantee code volume status of the data volume additional information 601a is "YES", the source storage system 2a determines that there is a guarantee code volume. Nevertheless, if the guarantee code volume status is in-migration, migration of the external volume (data) 90 is suspended on the migration is complete. When the migration-target external volume (data) 90a has not guarantee code volume (step 1501: N), the routine proceeds to step 1503.

When the migration-target external volume (data) 90a has a guarantee code volume (step 1501: Y), the external volume (guarantee code) 91a storing the guarantee code corresponding to the migration-target external volume (data) 90a is made to be the migration-target (step 1502). The source storage system 2a refers to the volume number (guarantee code) from the volume management information 60 corresponding to the external volume (data) 90a and specifies the external volume (guarantee code) 91a.

Subsequently, the source storage system 2a transfers information (management information) related to the migration-target external volume (data) 90a and the external volume (guarantee code) 91a to the target storage system 2b (step 1503). The management information to be transferred is volume management information 60 (including data volume additional information 601a, data volume information 602, guarantee code volume additional information 601b, guarantee code volume information 603) of the migration-target external volume (data) 90a and the external volume (guarantee code) 91a, external volume information 61 (including path information 610), and key information 62. The key information 62 is encrypted with an inter-system communication key and transferred. Incidentally, the target storage system 2b shall be selected from a storage system 2 having an authentication code support capable of creating and confirming the guarantee code as the same as the source storage system 2a through judgment based on the authentication code information 63.

Subsequently, the target storage system 2b receives information (management information) relating to the migration-target external volume (data) 90a and the external volume (guarantee code) 91a from the source storage system 2a (step 1504) (FIG. 16B), thereafter executes device recognition, detects the volume of other storage systems 2 and the external storage apparatus 8 and registers it in the external volume information 61 (step 1505). Thereupon, the target storage system 2b detects the data volume 92 and the guarantee code volume 93 of the external storage apparatus 8 corresponding to the migration-target external volume (data) 90a and the external volume (guarantee code) 91a, and the migration-target external volume (data) 90a, and registers these in the external volume information 61 (step 1505).

Subsequently, the target storage system 2b defines an alternate path of the volume registered in the external volume information 61 (step 1506), and, when the same volume is visible from a plurality of ports, it registers such volume in the path information 610, and decides the priority of the access path.

Subsequently, the target storage system 2b defines the data volume 92 and the guarantee code volume 93 of the external storage apparatus 8 corresponding to the migration-target external volume (data) 90a and the external volume (guarantee code) 91a in the volume of other storage systems 2 or the external storage apparatus 8 registered in the external volume information 61 as the external volume (data) 90b and the external volume (guarantee code) 91b (step 1507). Here, the target storage system 2b sets the volume management information 60 and the data volume additional information 601a/guarantee code volume additional information 601b, and registers the external volume information 61 in the data volume information 602/guarantee code volume information 603. Incidentally, the caching status shall be in a state of non-execution.

Subsequently, the target storage system 2b registers the migration-target external volume (data) 90a registered in the external volume information 61 in the data volume information 602 of the external volume (data) 90b (on the side in which the data volume 92 is not registered), updates the valid information flag, and validates the data volume information 602 of the migration-target external volume (data) 90a (step 1508). Thereby, the access request from the host computer 10 to the external volume (data) 90b of the target storage system 2b will be executed as the access request from the target storage system 2b to the migration-target external volume (data) 90a of the source storage system 2a. The target storage system 2b thereafter defines a path to the host computer 10 of the external volume (data) 90b (step 1509) (in FIG. 16C, "P" represents a priority path and "S" represents a non-priority path).

Figure 16A:
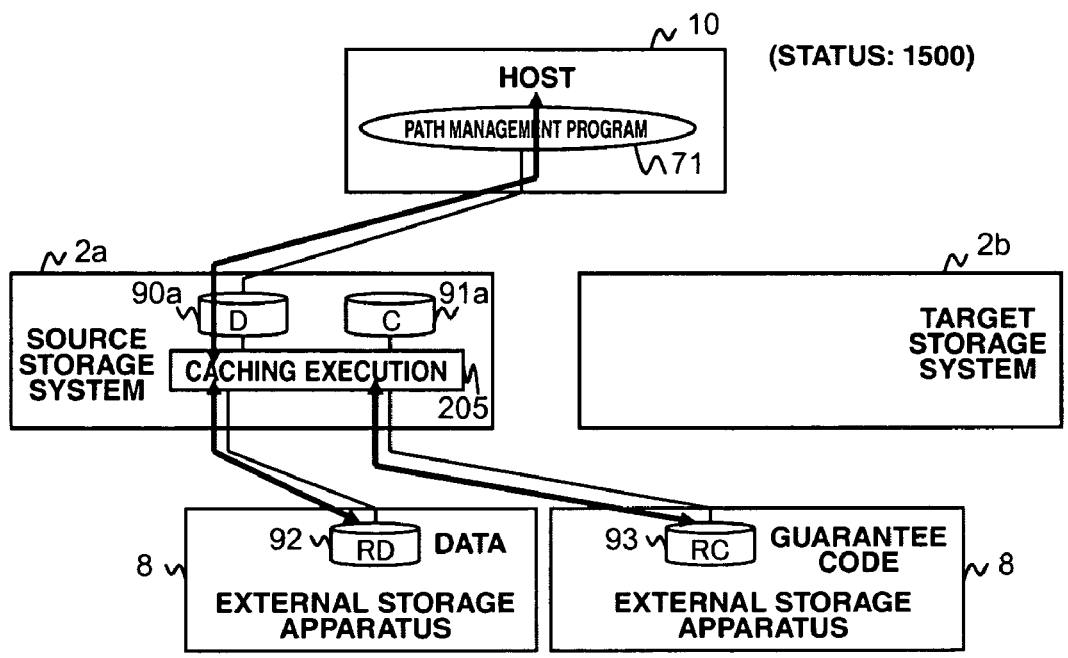
FIG. 16A is a block diagram showing the status of a system in a partial routine of FIGS. 15A, B, and C of migrating the external volume management from the source storage system to the target storage system according to an embodiment of the present invention.
Figure 16B:
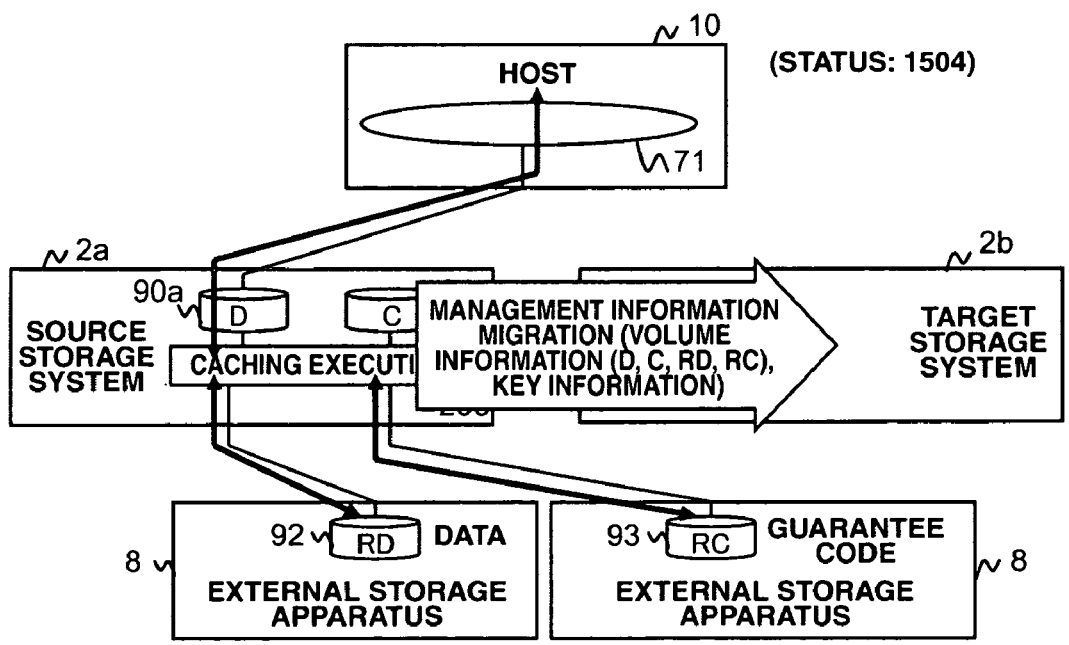
FIG. 16B is another block diagram showing the status of the system in a partial routine of FIGS. 15A, B, and C.
Figure 16C:
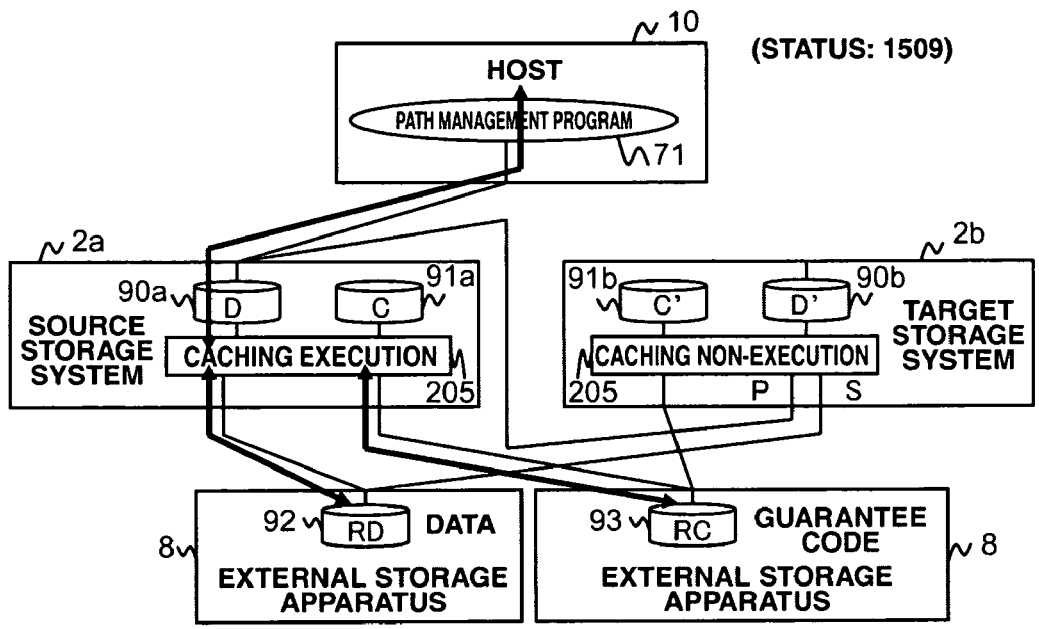
FIG. 16C is another block diagram showing the status of the system in a partial routine of FIGS. 15A, B, and C.
Figure 16D:
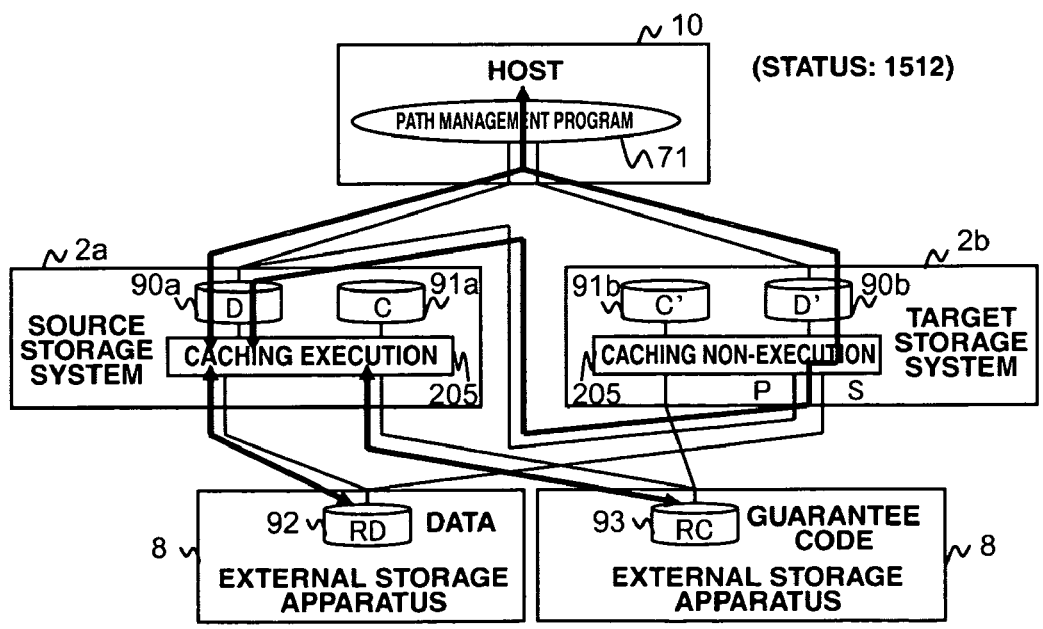
FIG. 16D is another block diagram showing the status of the system in a partial routine of FIGS. 15A, B, and C.

Now referring to FIG. 15B, the host computer 10 adds a path definition to the external volume (data) 90b of the target storage system 2b (step 1510), thereafter executes device recognition, and detects the external volume (data) 90b of the target storage system 2b (step 1511). Subsequently, the host computer 10 defines the external volume (data) 90b of the target storage system 2b as an alternate path for accessing data stored in the data volume 92 in the path management program 71 (step 1512) (FIG. 16D). Thereafter, the host computer 10 starts accessing the external volume (data) 90b of the target storage system 2b.

Figure 16E:
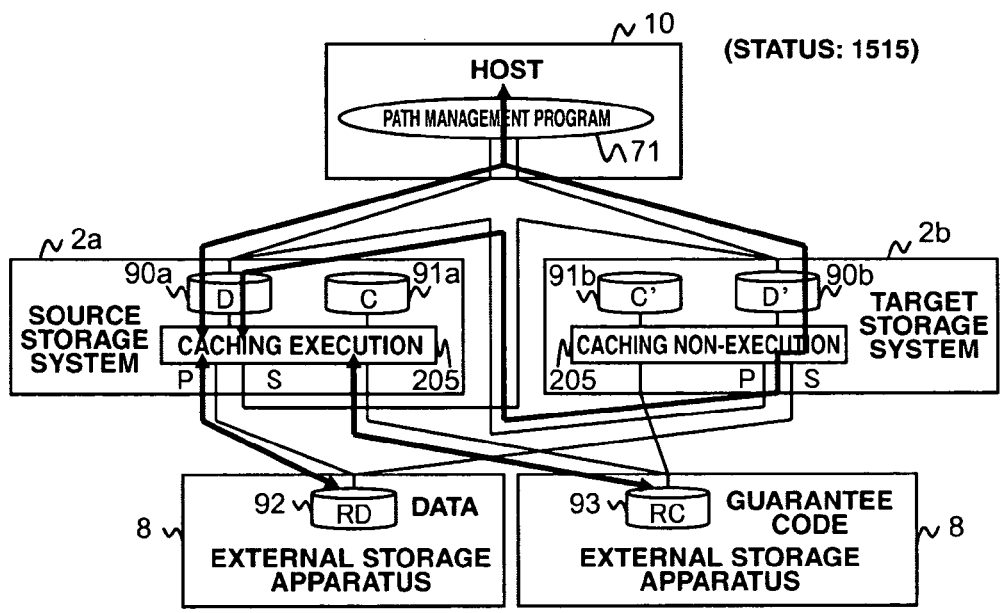
FIG. 16E is another block diagram showing the status of the system in a partial routine of FIGS. 15A, B, and C.

Subsequently, the source storage system 2a executes device recognition, and registers the external volume (data) 90b of the target storage system 2b in the external volume information 61 (step 1513). The source storage system 2a thereafter defines an alternate path of the volume registered in the external volume information 61 (step 1514). Then, the source storage system 2a registers the external volume (data) 90b of the target storage system 2b registered in the external volume information 61 in the data volume information 602 of the migration-target external volume (data) 90a (side in which the data volume 92 is not registered) (step 1515) (FIG. 16E). Thereby, if the valid information flag is inverted, the access request from the host computer 10 to the migration-target external volume (data) 90a of the source storage system 2a will be executed as the access request from the source storage system 2a to the external volume (data) 90b of the target storage system 2b.

Figure 16F:
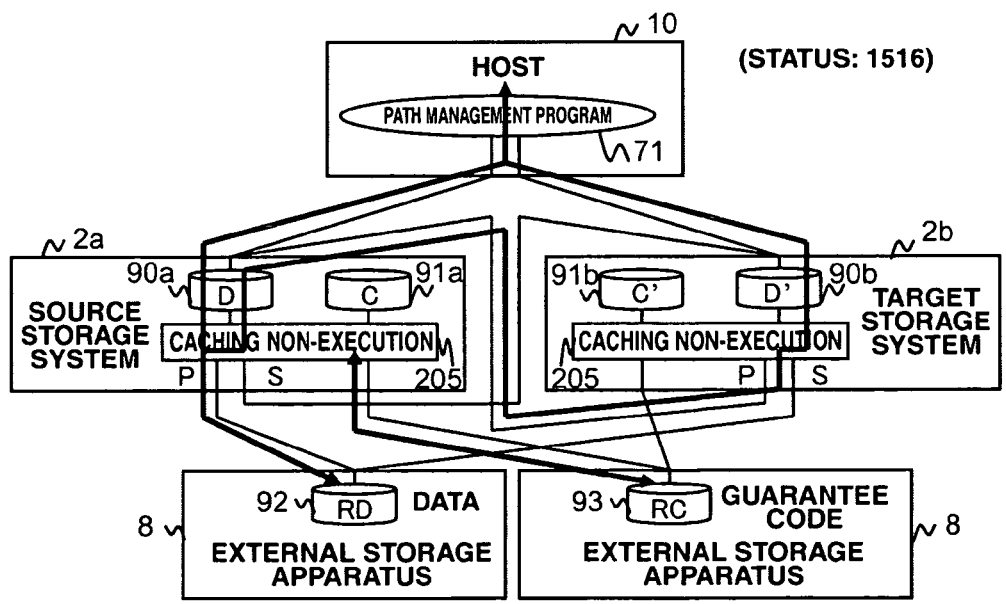
FIG. 16F is another block diagram showing the status of the system in a partial routine of FIGS. 15A, B, and C.

Subsequently, the host computer 10 destages all dirty data of the cache memory 205 of the migration-target external volume (data) 90a and the external volume (guarantee code) 91a to the data volume 92 and the guarantee code volume 93, and, after the completion of such destaging, changes the caching execution status of the migration-target external volume (data) 90a and the external volume (guarantee code) 91a to "non-execution" (step 1516) (FIG. 16F). Thereby, data of the data volume 92 and the guarantee code volume 93 is not cached in either the source storage system 2a or the target storage system 2b, and will be subject to a through operation between the host computer 10 and the data volume 92 and guarantee code volume 93.

Figure 16G:
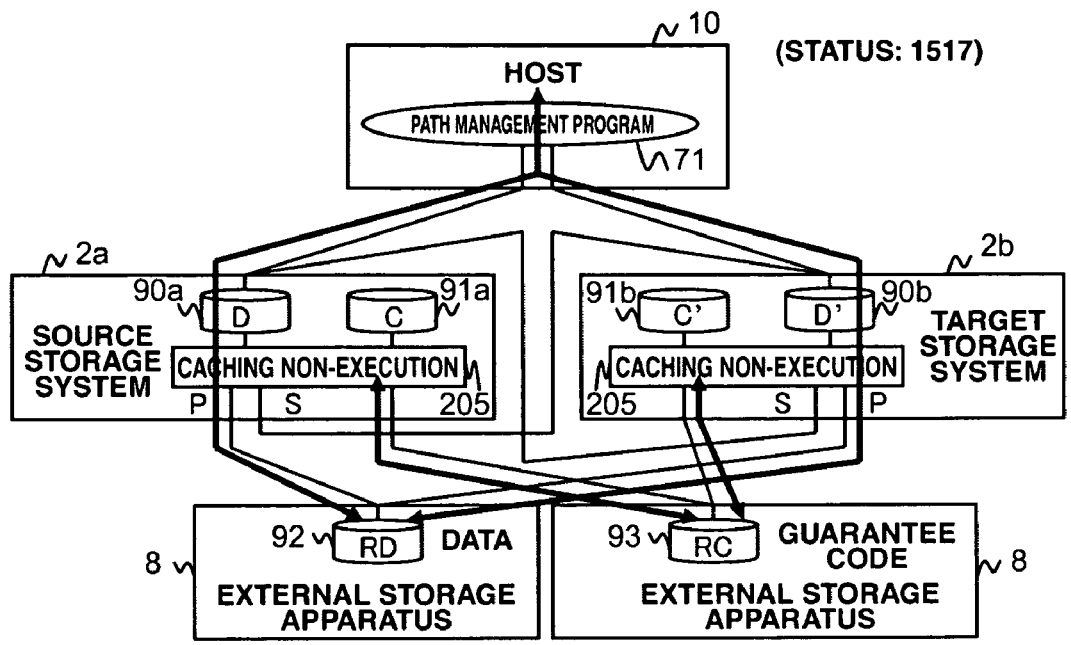
FIG. 16G is another block diagram showing the status of the system in a partial routine of FIGS. 15A, B, and C.

Subsequently, the target storage system 2b inverts the valid information flag of the external volume (data) 90b of the target storage system 2b, and validates the data volume information 602 on the side in which the data volume 92 is registered (step 1517) (FIG. 16G). Thereby, the access request from the host computer 10 to the external volume (data) 90b of the source storage system 2b will be executed as the access request from the source storage system 2b to the data volume 92. Thus, since the destaging/staging to the data volume 92 will be commenced, the access request to the guarantee code volume 93 will be issued for the creation/confirmation of the guarantee code.

Figure 16H:
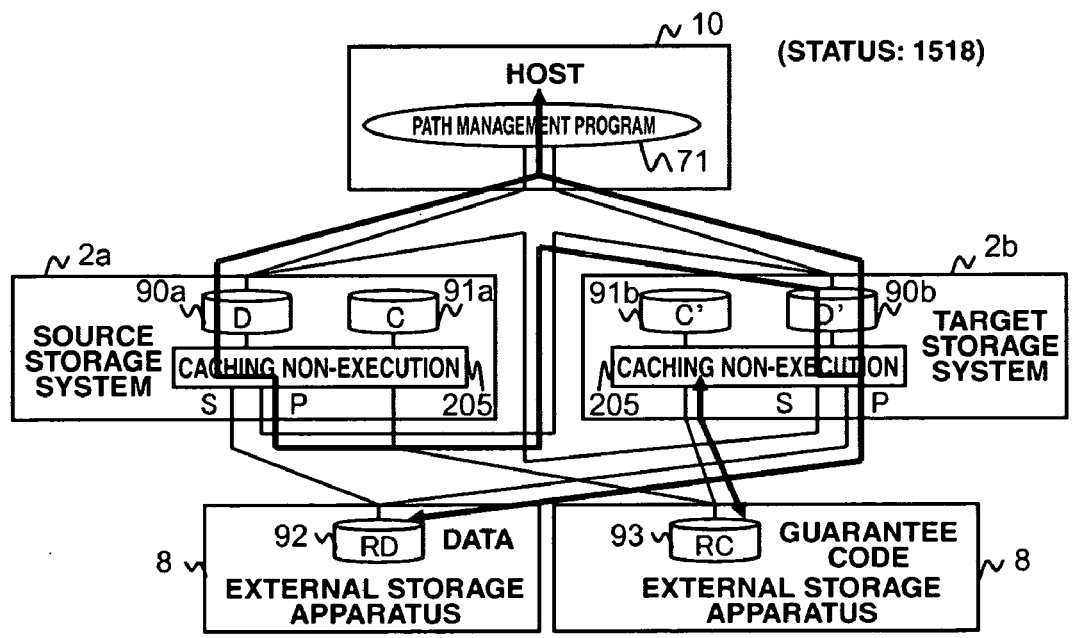
FIG. 16H is another block diagram showing the status of the system in a partial routine of FIGS. 15A, B, and C.
Figure 16I:
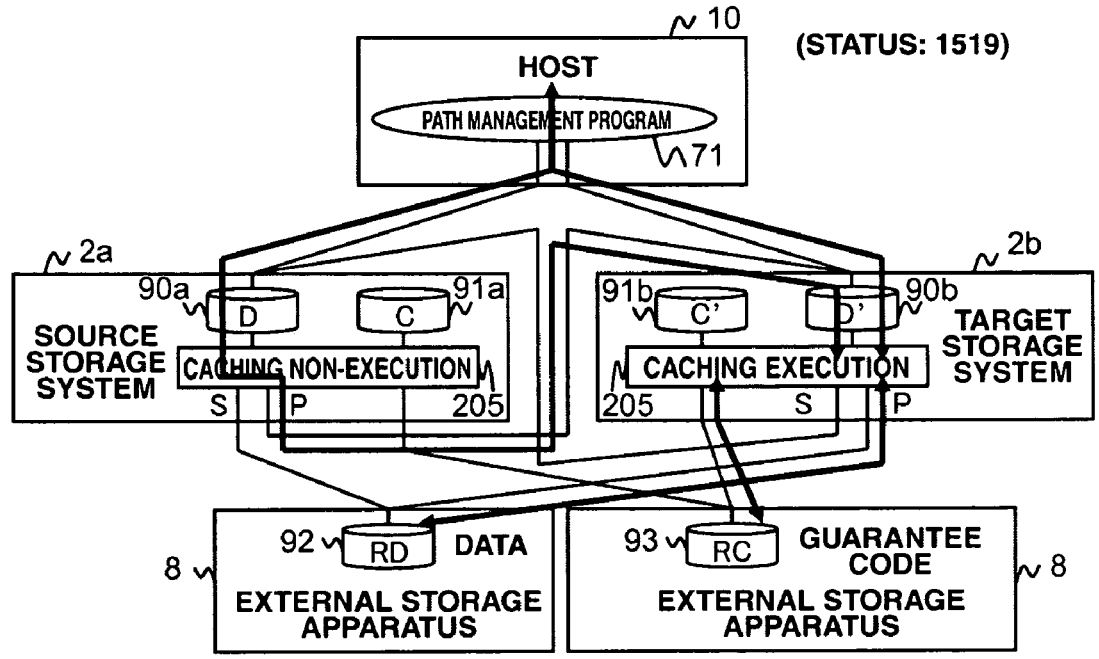
FIG. 16I is another block diagram showing the status of the system in a partial routine of FIGS. 15A, B, and C.

Subsequently, the source storage system 2a inverts the valid information flag of the migration-target external volume (data) 90a, and validates the data volume information 602 on the side in which the external volume (data) 90b of the target storage system 2b is registered (step 1518) (FIG. 16H). Thereby, the access request from the host computer 10 to the migration-target external volume (data) 90a of the source storage system 2a will be executed as the access request from the source storage system 2a to the external volume (data) 90b of the target storage system 2b. Thus, since the destaging/staging to the data volume 92 will be suspended, access to the guarantee code volume 93 will be suspended. The target storage system 2b thereafter changes the caching execution status of the external volume (data) 90b and the external volume (guarantee code) 91b to "in-execution" (step 1519) (FIG. 16I).

Figure 16J:
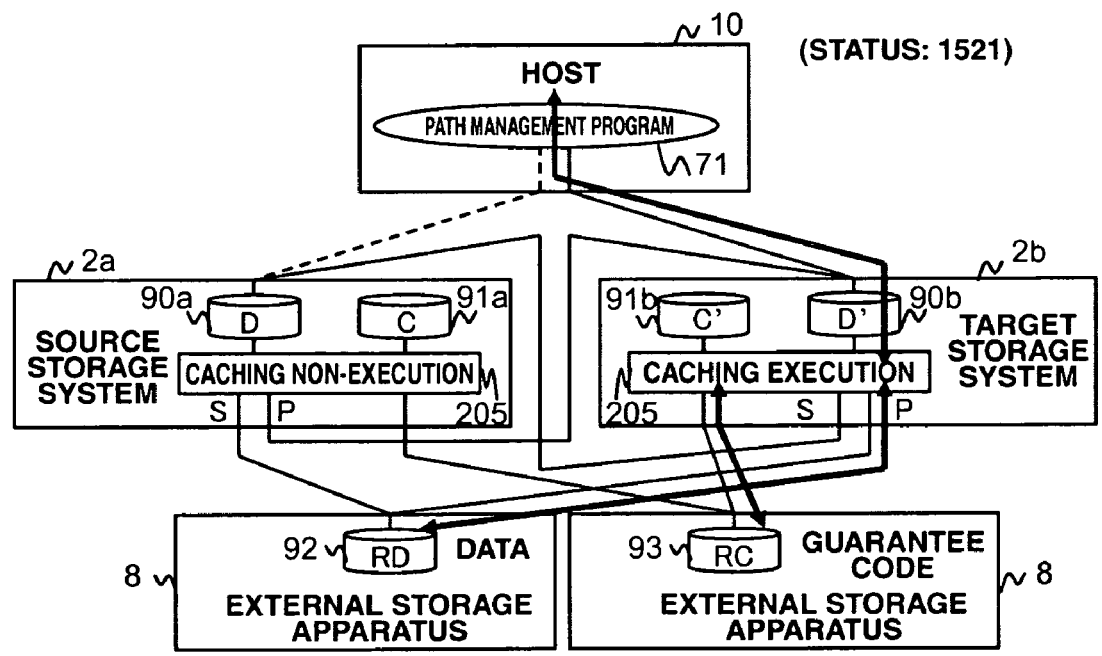
FIG. 16J is another block diagram showing the status of the system in a partial routine of FIGS. 15A, B, and C.

Returning to FIG. 15C, the host computer 10 thereafter deletes the migration-target external volume (data) 90a of the target storage system 2a from the definition as the alternate path for accessing data stored in the data volume 92 in the path management program 71 (step 1520). Thereafter, access from the host computer 10 to the external volume (data) 90a of the source storage system 2a will be suspended. Subsequently, the host computer 10 deletes the path definition corresponding to the migration-target external volume (data) 90a of the target storage system 2a (step 1521) (FIG. 16J).

Figure 16K:
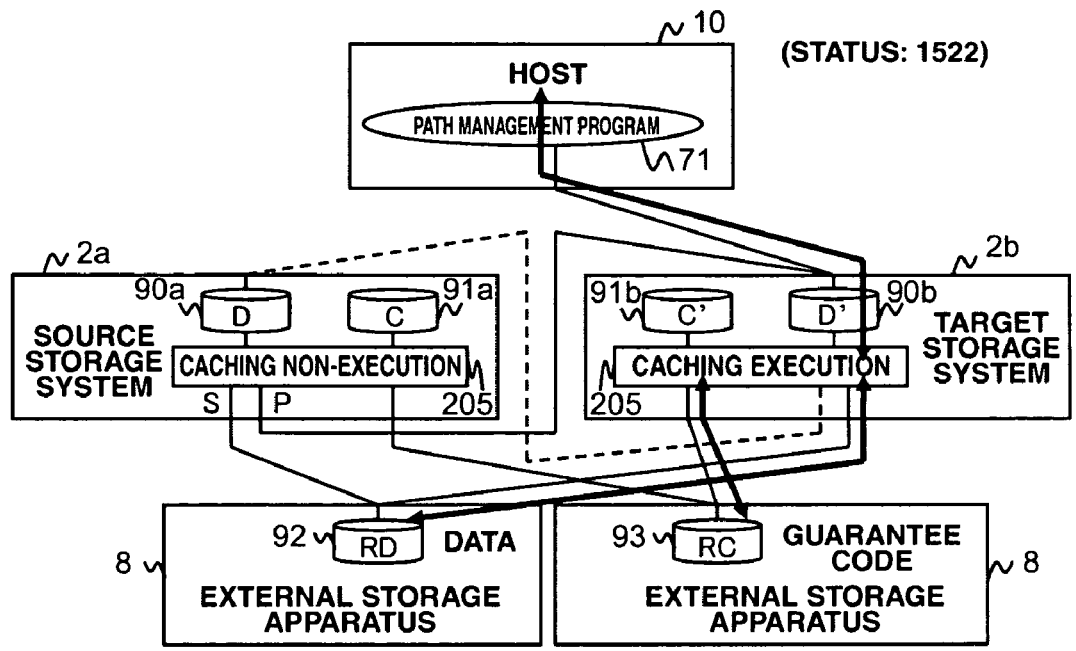
FIG. 16K is another block diagram showing the status of the system in a partial routine of FIGS. 15A, B, and C.

Subsequently, the target storage system 2b deletes the migration-target external volume (data) 90a of the source storage system 2a from the data volume information 602 of the migration-target external volume (data) 90b of the target storage system 2b (step 1522) (FIG. 16K).

Figure 16L:
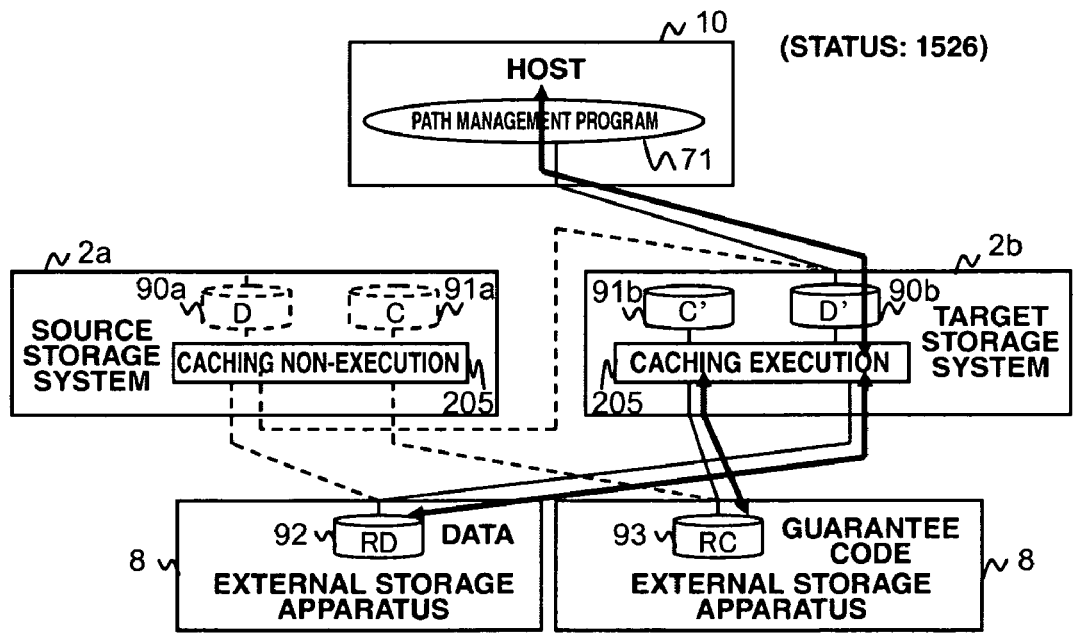
FIG. 16L is another block diagram showing the status of the system in a partial routine of FIGS. 15A, B, and C.

Subsequently, the source storage system 2a releases the path definition to the host computer 10 of the migration-target external volume (data) 90a (step 1523). The source storage system 2a thereafter deletes the external volume (data) 90b of the source storage system 2b from the data volume information 602 of the migration-target external volume (data) 90a (step 1524). Then, the source storage system 2a deletes the migration-target external volume (data) 90a from the definition of the external volume (guarantee code) 91a of the source storage system 2b (step 1525). In other words, the source storage system 2a clears the volume management information 60 (including data volume additional information 601a/guarantee code volume additional information 601b, data volume information 602/guarantee code volume information 603). Finally, the source storage system 2a deletes the external volume information 61 (including path information 610) of the migration-target data volume 92 and the guarantee code volume 93 (step 1526) (FIG. 16L).

According to the present embodiment, it is possible to improve the data guarantee performance of the external storage apparatus 8, and switch the management source of the external storage apparatus 8 while maintaining the data guarantee performance of the external storage apparatus 8.

Figure 17:
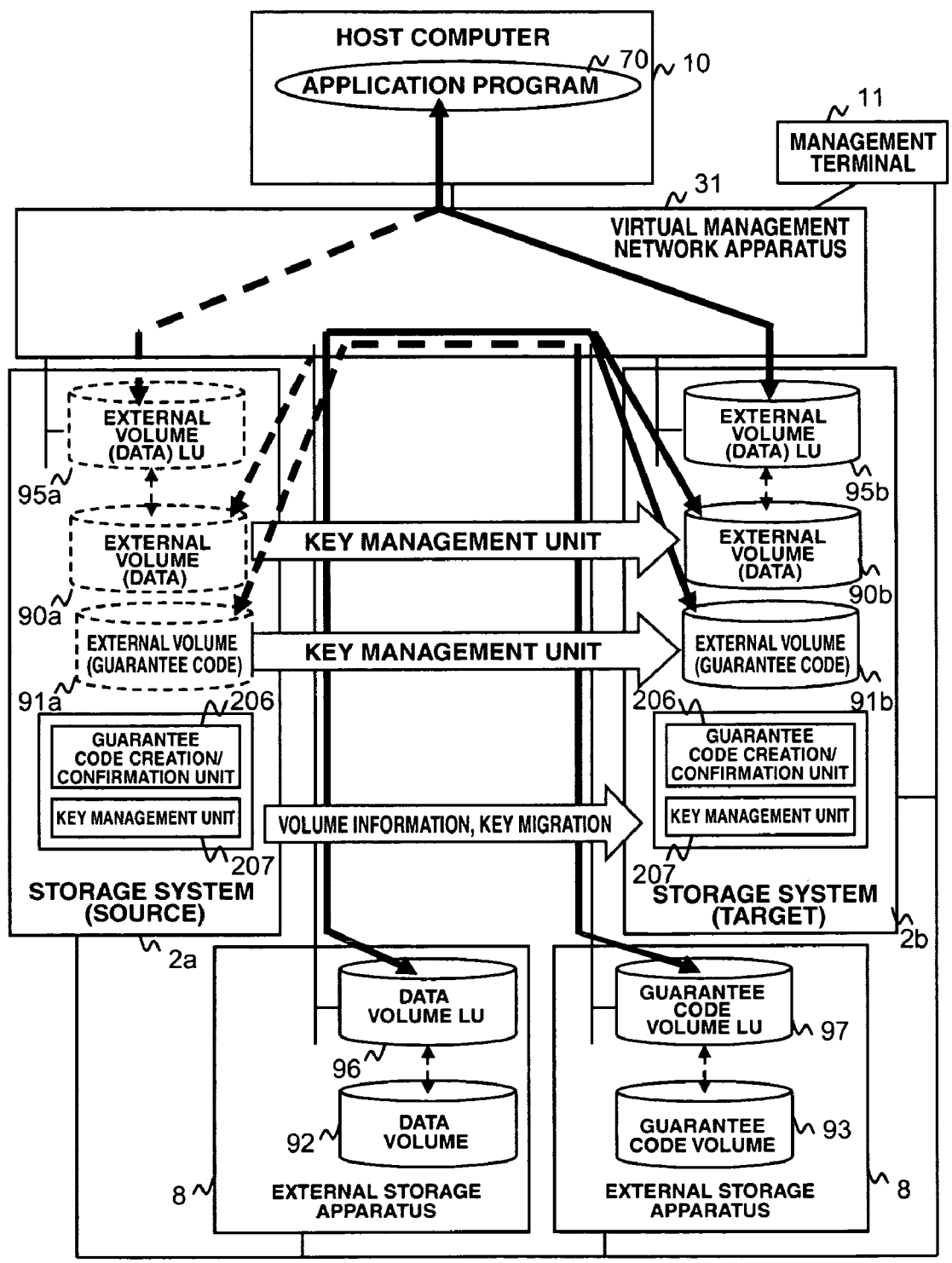
FIG. 17 is a configuration diagram showing another embodiment according to the present invention.

FIG. 17 shows a configuration diagram of a second embodiment according to the present invention. In order to avoid redundant explanation, only the differences with the first embodiment are explained.

In FIG. 17, as a substitute for the path management program 71 loaded in the host computer 10, the network 3 acts as a virtual management network apparatus 31 having a virtual management function. The virtual management network apparatus 31 has a function of arbitrarily allocating a volume group provided by one or more storage systems 2 to the host computer 10.

Figure 18:
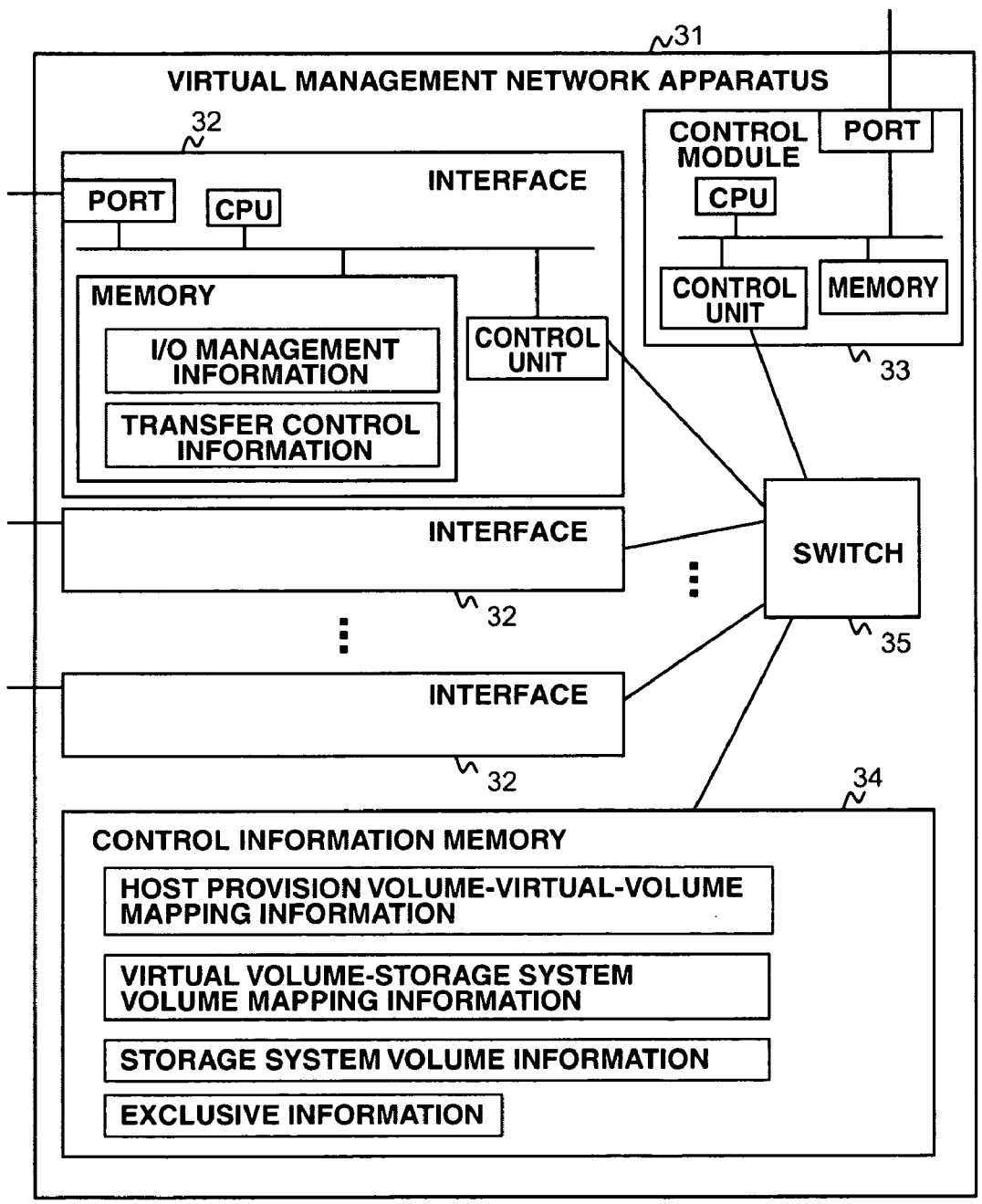
FIG. 18 is a configuration diagram showing an example of a virtual management network apparatus in another embodiment according to the present invention.

FIG. 18 shows a configuration example of the virtual management network apparatus 31. Incidentally, the present invention is not limited to this configuration example.

The virtual management network apparatus 31 is configured by mutually connecting an interface 32, a control module 33, and a control information memory 34 via a switch 35. Connection may be via switch connection or bus connection, but the present invention is not limited to these connection methods. Incidentally, there are a plurality of interfaces 32. Further, the control information memory 34 is made redundant.

The interface 32 is connected to the host computer 10, the storage system 2, and the external storage apparatus 8. The memory of the interface 32 stores I/O management information for managing the read/write request, data, status and so on, and transfer control information (virtual management network apparatus internal/external) for specifying these transfer destinations.

The control module 33 changes the configuration of the virtual management network apparatus 31 and monitors the internal status. Incidentally, the virtual management network apparatus 31 may also be connected to the management terminal 11 or the like, and be operated based on an external command from the management terminal 11 or the like.

The control information memory 34 stores exclusive information for exclusively controlling the update of data stored in the control information memory 34, storage system volume information (this storage system volume information has unique information, address information, volume number and the like of the storage system 2) as information concerning the volume of the storage system 2 detected by the virtual management network apparatus 31, and host provision volume/virtual volume mapping information for managing how to present the virtual volume/storage system volume mapping information, which shows the correspondence of the detected storage system volume and the virtual volume configured from this volume, to the host computer 10 (that is, how to make the virtual volume be accessed by the host computer 10).

The host computer 10 is able to access the virtual volume that is associated to itself in the host provision volume/virtual volume mapping information. When the host computer 10 it to access the virtual volume, it sends an access request with identifying information of the host provision volume. The virtual management network apparatus 31 that receives this access request refers to the host provision volume/virtual volume mapping information to determine the virtual volume, and further refers to the virtual volume/storage system volume mapping information to determine the volume number of the storage system 2 shown in the identifying information in the access request. The virtual management network apparatus 31 converts the access request received from the host computer 10 into an access request with the determined volume number (or identifying information of the determined volume), and sends this to the determined storage system 2.

Upon switching the access destination volume of the host computer 10, the virtual management network apparatus 31 will rewrite the virtual volume/storage system volume mapping information based on the volume switch command from the management terminal 11 or the host computer 10. In other words, the virtual management network apparatus 31 rewrites the storage system volume associated with the virtual volume corresponding to the host provision volume designated as the access destination upon the host computer 10 accessing the migration-target volume from a migration-target volume of the of the source storage system 2a into a migration-target volume of the target storage system 2b.

Accordingly, even when the access destination volume is changed from the source storage system 2a to the target storage system 2b, the host computer 10 will still be able to access the migration-target volume even after the change of the access destination volume by continuing to use the identifying information of the same host provision volume and the virtual volume. Incidentally, the rewriting of the virtual volume/storage system volume mapping information and the transmission of the access request based on the mapping information are executed by the CPU in the virtual management network apparatus 31 executing the programs stored in the memory of the virtual management network apparatus 31.

The processing executed by the host computer 10 in FIG. 15 (steps 1510, 1511, 1512, 1520, 1521) will be executed by the virtual management network apparatus 31.

According to the present embodiment, the host computer 10 will still be able to access the migration-target volume after the change of the access destination volume by continuing to use the identifying information of the host-provision volume and virtual volume even when the access destination volume is changed from the source storage system 2a to the target storage system 2b.

What is claimed is:

1. A computer system comprising a plurality of storage systems for managing a storage extent of an external storage apparatus connected to a network as a volume, and a host computer connected to said network;
   wherein a source storage system among said plurality of storage systems comprises:
   a guarantee code creation unit for creating a guarantee code corresponding to read or write access-target data;
   a processor for controlling the writing of said created guarantee code in said external storage apparatus or the reading of said guarantee code stored in said external storage apparatus;
   a confirmation unit for confirming the concordance of a guarantee code created from said access-target data and a guarantee code read from said external storage apparatus as a guarantee code corresponding to said access-target data; and
   a management migration unit for migrating data stored in said external storage apparatus and management information including volume management information of a migration-target external volume and key information which includes a volume key of an external volume, each information being related to said guarantee code;
   wherein a target storage system comprises a management unit for managing said management information migrated from said source as target management information.

2. The computer system according to claim 1, wherein said processor executes, in response to an access request from said host computer, change processing of an old guarantee code already stored in said old guarantee code area according to old guarantee code information when making an old guarantee code area among storage extents of said external storage apparatus an access destination, and executes processing for adding a new guarantee code to a new guarantee code area according to new guarantee code information when making a new guarantee code area and access destination.

3. The computer system according to claim 1, wherein said processor executes, in response to an access request from said host computer, change processing of an old guarantee code already stored in said old guarantee code area according to old guarantee code information when making an old guarantee code area among storage extents of said external storage apparatus an access destination, and processing for adding a new guarantee code adjacent to a block storing data among new guarantee code areas according to new guarantee code information when making a new guarantee code area an access destination.

4. The computer system according to claim 1, further comprising a virtual management network apparatus for managing an access path to data stored in said external storage apparatus in priority to said host computer,
   wherein each of said storage systems is connected to said host computer via said virtual management network apparatus.

5. A processing method of a computer system including a plurality of storage systems for managing a storage extent of an external storage apparatus connected to a network as a volume, and a host computer connected to said network, said method comprising;
   upon making one of said plurality of storage systems a source and another target, migrating, by said source storage system, data stored in said external storage apparatus and management information including volume management information of a migration-target external volume and key information which includes a volume key of an external volume, each information being related to said guarantee code, and
   migrating, by said target storage system, management information migrated from said source as target management information.

6. A processing method of a computer system including a plurality of storage systems, comprising:
   migrating data stored in an external storage apparatus and management information relating to (1) guarantee code in correspondence with a data (2) volume management information of a migration-target external volume and (3) key information which includes a volume key of an external volume, to said target storage system in said plurality of storage systems, said method further comprising, upon migrating said data and management information:

managing, by a host computer, an access path from each of said plurality of storage systems to data stored in said external storage apparatus;

upon making one of said plurality of storage systems a source and another target, accessing, by said target storage system, management-target data of said source storage system among data stored in said external storage apparatus via a source volume managed by said source storage system;

starting, by said host computer, using an access pathway to data via said source volume upon access of said target storage system;

writing, by said source storage system, dirty data of a management-target volume in said external storage apparatus, and thereafter stopping using a cache memory of data stored in said external storage apparatus;

making, by said target storage system, said external storage apparatus directly access management-target data;

accessing, by said source storage system, management-target data among data stored in said external storage apparatus via a target volume managed by said target storage system;

starting, by said target storage system, using a cache memory of data stored in said external storage apparatus; and stopping, by said host computer, using an access pathway to data via said source volume.

* * * * *